US010749451B2

(12) United States Patent
Hosaka et al.

(10) Patent No.: US 10,749,451 B2
(45) Date of Patent: Aug. 18, 2020

(54) MOTOR DRIVING CONTROL APPARATUS AND MOTOR-ASSISTED VEHICLE

(71) Applicant: TAIYO YUDEN CO., LTD., Tokyo (JP)

(72) Inventors: Yasuo Hosaka, Tokyo (JP); Yuuji Ebinuma, Tokyo (JP); Taichi Yanaoka, Tokyo (JP); Hirokazu Shirakawa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/290,806

(22) Filed: Mar. 1, 2019

(65) Prior Publication Data

US 2019/0280628 A1 Sep. 12, 2019

(30) Foreign Application Priority Data

Mar. 6, 2018 (JP) .................................. 2018-039760

(51) Int. Cl.
*H02P 3/14* (2006.01)
*B60L 50/20* (2019.01)
(Continued)

(52) U.S. Cl.
CPC .................. *H02P 3/14* (2013.01); *B60L 7/16* (2013.01); *B60L 7/26* (2013.01); *B60L 50/00* (2019.02);
(Continued)

(58) Field of Classification Search
CPC .......... B60L 2240/12; B60L 7/26; B60L 7/18; B60L 2240/421; B60L 2240/443;
(Continued)

(56) References Cited

U.S. PATENT DOCUMENTS 5,268,624 A * 12/1993 Zanger ................ A61F 9/00745
318/551
5,477,116 A * 12/1995 Journey ................ B60K 26/00
318/551
(Continued)

FOREIGN PATENT DOCUMENTS

CN 1421333 A 6/2003
CN 105377619 A 3/2016
(Continued)

OTHER PUBLICATIONS

Extended European Search Report dated Aug. 7, 2019, issued by the European Patent Office in corresponding application EP 19160737.3.
(Continued)

*Primary Examiner* — Thai T Dinh
(74) *Attorney, Agent, or Firm* — Stein IP, LLC

(57) ABSTRACT

An embodiment of this invention relates to a motor driving control apparatus for a moto-assisted vehicle, which includes a driving unit configured to drive a motor, and a controller configured to determine a regeneration amount based on a first speed of a vehicle that moves by the motor driven by the driving unit, and control the driving unit according to the regeneration amount, wherein the first speed is a speed at a first timing when it is detected that a brake of the vehicle is changed to OFF, or is determined based on temporal change in an acceleration of the vehicle.

16 Claims, 16 Drawing Sheets

(51) Int. Cl.

| | | |
|---|---|---|
| *B60L 7/16* | (2006.01) | |
| *B62M 6/45* | (2010.01) | |
| *B60T 8/32* | (2006.01) | |
| *B60L 50/00* | (2019.01) | |
| *B60T 8/17* | (2006.01) | |
| *B60L 7/26* | (2006.01) | |

(52) U.S. Cl.
CPC ............... *B60L 50/20* (2019.02); *B60T 8/17* (2013.01); *B60T 8/1706* (2013.01); *B60T 8/32* (2013.01); *B62M 6/45* (2013.01); *B60L 2200/12* (2013.01); *B60T 2270/604* (2013.01); *H02P 2205/07* (2013.01)

(58) Field of Classification Search
CPC ...... B60L 2250/26; B60L 50/00; B60L 50/20; B60L 7/16; B60L 7/24; B60T 8/17; B60T 8/1706; B60T 8/32; H02P 3/14; B62M 6/45
See application file for complete search history.

(56) References Cited

U.S. PATENT DOCUMENTS

| | | | | |
|---|---|---|---|---|
| 6,356,818 | B1 * | 3/2002 | Wakashiro | B60K 6/485 |
| | | | | 701/22 |
| 6,462,506 | B2 * | 10/2002 | Cochoy | B60L 50/52 |
| | | | | 318/801 |
| 10,296,036 | B2 * | 5/2019 | Cosby | B60Q 1/441 |
| 2010/0252345 | A1 | 10/2010 | Hoshino | |
| 2014/0121877 | A1 * | 5/2014 | Hosaka | B62M 6/45 |
| | | | | 701/22 |
| 2016/0121963 | A1 | 5/2016 | Tanaka et al. | |

FOREIGN PATENT DOCUMENTS

| | | | | |
|---|---|---|---|---|
| EP | 2 631 165 A1 | | 8/2013 | |
| EP | 3 009 295 A1 | | 6/2014 | |
| EP | 2 868 562 A1 | | 5/2015 | |
| EP | 3009295 A1 | * | 4/2016 | ............... B60L 7/10 |
| EP | 3 459 782 A1 | | 9/2018 | |
| EP | 3459782 A1 | * | 3/2019 | ........... B62D 5/0463 |
| JP | 2002-145168 A | | 5/2002 | |
| JP | 2002-369317 A | | 12/2002 | |
| JP | 2010-259312 A | | 11/2010 | |
| JP | 2010-279186 A | | 12/2010 | |
| JP | 2013-209077 A | | 10/2013 | |
| JP | 2014-90539 A | | 5/2014 | |
| JP | 5655989 B2 | | 1/2015 | |

OTHER PUBLICATIONS

Taiwanese Office Action dated Nov. 29, 2019, issued to Taiwanese i Application No. 108101988.
Japanese Office Action dated Feb. 4, 2020, issued to Japanese Application 2018-039760.
Chinese Office Action dated May 6, 2020, issued by the State Intellectual Property Office of People's Republic of China in corresponding application CN 201910160628.0.

* cited by examiner

MOTOR DRIVING CONTROL APPARATUS AND MOTOR-ASSISTED VEHICLE

CROSS-REFERENCE TO RELATED APPLICATIONS

This application is based upon and claims the benefit of priority of the prior Japanese Patent Application No. 2018-039760, filed on Mar. 6, 2018, the entire contents of which are incorporated herein by reference.

FIELD

This invention relates to a regenerative control technique for a motor-assisted vehicle.

BACKGROUND

There are various methods for determining when the regenerative control is performed. For example, there is a method for automatically functioning it according to an acceleration (e.g. Patent document 1).

According to this method, the regeneration automatically begins without any user's operation. Therefore, it is expected that an amount of regeneration increases by performing the regeneration even in a running state where the regeneration has not been performed. On the other hand, if the regeneration automatically begins when the user does not intend the deceleration, the user may feel uncomfortable.

Moreover, another document (e.g. Patent document 2) discloses a motor driving control apparatus that includes (a) a detector to detect a start instruction or stop instruction of regenerative control by a driver; (b) a control coefficient calculation unit, upon detecting the start instruction of the regenerative control by the detector, to specify a first vehicle speed at a detection timing and set a predetermined value for a control coefficient for a target amount of regeneration, and to increase a value of the control coefficient when a current vehicle speed is faster than the first vehicle speed, and decrease the value of the control coefficient when the current vehicle speed is slower than the first vehicle speed; and (c) a controller to control driving of the motor by the value of the control coefficient from the control coefficient calculation unit and the target amount of regeneration. According to this document, the start instruction of the regenerative control is detected by an inverse pedal rotation whose angel is equal to or greater than a predetermined phase angle, ON of an instruction switch for the start instruction of the regenerative control or a series of ONs of a brake switch within a predetermined time period.

According to the technique described in this document, it is possible to function a regenerative braking force while taking into consideration the driver's intention and perform the regenerative control so as to keep the first vehicle speed as much as possible. However, it is assumed that the driver remembers an operation to perform the start instruction of the regenerative control with intention to designate the first vehicle speed. Moreover, according to the aforementioned technique, the vehicle speed at the start instruction of the regenerative control is tried to be kept. However, the vehicle speed preferable for the driver may not always be the vehicle speed at the start instruction of the regenerative control.

Patent Document 1: Japanese Patent No. 5655989.
Patent Document 2: Japanese Laid-open Patent Document No. 2014-90539

Namely, there is no technique for performing the regenerative control according to a running state presumed as user's intention that appears in the braking operation.

SUMMARY

A motor driving control apparatus relating to a first mode of the present invention includes: (A) an inverter configured to drive a motor; and (B) a controller configured to determine a regeneration amount based on a first speed of a vehicle at a first timing when it is detected that a brake of the vehicle that moves by the motor driven by the inverter was changed to OFF, and control the inverter according to the regeneration amount.

A motor driving control apparatus relating to a second mode of the present invention includes: (C) an inverter configured to drive a motor; and (D) a controller configured to determine a first speed of a vehicle, which is a reference speed, based on temporal change in an acceleration of the vehicle that moves by the motor driven by the inverter, and control the inverter according to a regeneration amount that is based on the first speed.

DESCRIPTION OF EMBODIMENTS

In the following, embodiments of this invention will be explained by using an example of a motor-assisted bicycle that is an example of a motor-assisted vehicle. However, the embodiments of this invention can be applied to a motor driving control apparatus for a motor or the like to assist movement of a mobile object (e.g. a hand truck, a wheelchair, an elevator or the like) that moves according to a human power, and are not limited to a motor driving control apparatus for the motor-assisted bicycle.

Embodiment 1

Figure 1:
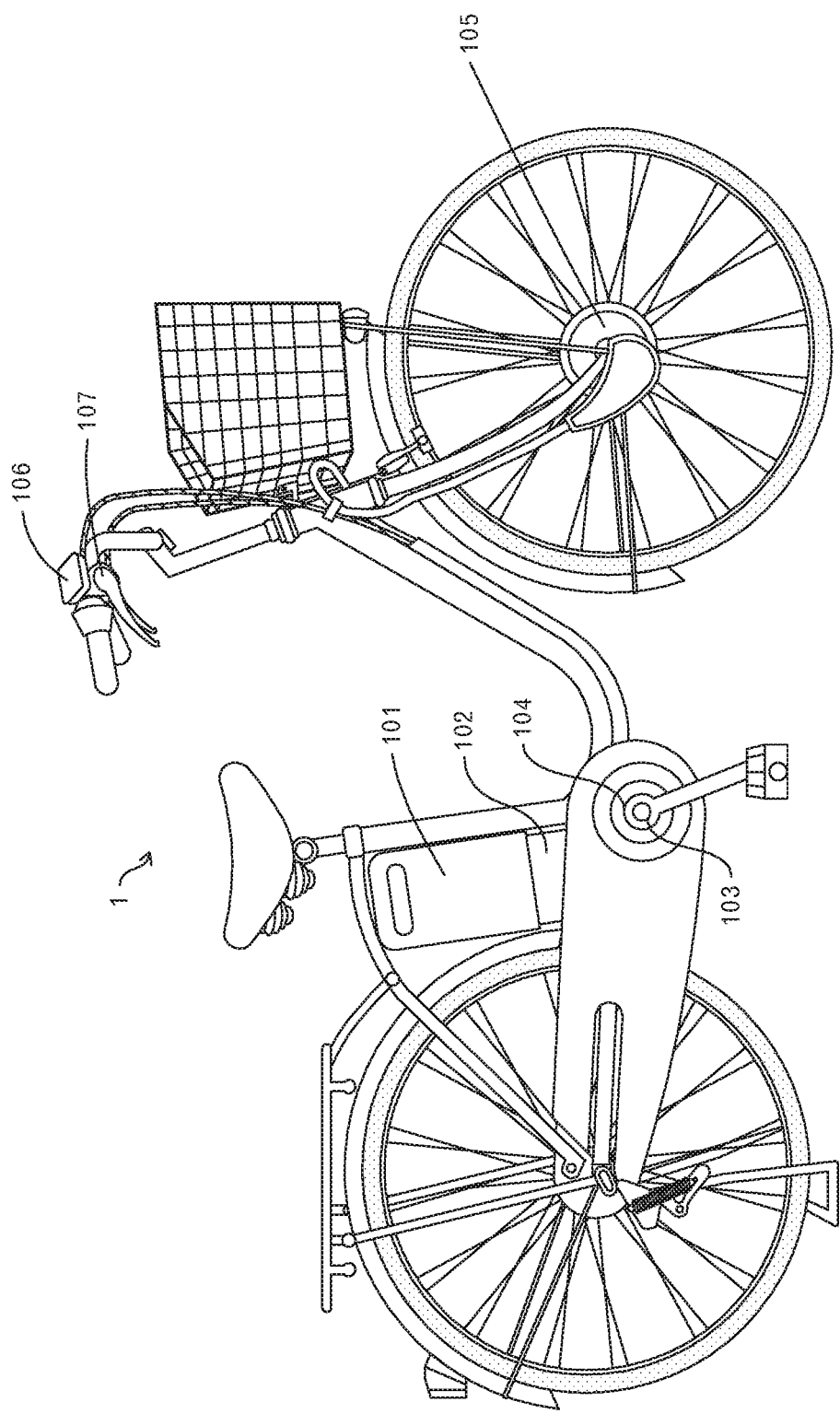
FIG. 1 is a diagram depicting an external view of a motor-assisted bicycle.

FIG. 1 illustrates an external view depicting an example of a motor-assisted bicycle in this embodiment. This motor-assisted bicycle 1 is equipped with a motor driving apparatus. The motor driving apparatus has a battery pack 101, a motor driving control apparatus 102, a torque sensor 103, a pedal rotation sensor 104, a motor 105, a control panel 106 and a brake sensor 107.

In addition, the motor-assisted bicycle 1 also has a front wheel, a rear wheel, a freewheel, a transmission and the like.

The battery pack 101 is, for example, a lithium-ion rechargeable battery, however, may be another kind of battery such as a lithium-ion polymer rechargeable battery, or a nickel-hydrogen battery. And, the battery pack 101 supplies the power to the motor 105 through the motor driving control apparatus 102, and charging is also performed by the regenerative power from the motor 105 through the motor driving control apparatus 102 during the regeneration.

The torque sensor 103 is provided near the crankshaft, detects a pedal force from the rider, and outputs this detection result to the motor driving control apparatus 102. Similarly to the torque sensor 103, the pedal rotation sensor 104 is provided near the crankshaft, and outputs a signal according to the rotation to the motor driving control apparatus 102.

The motor 105 is, for example, a well-known three-phase brushless motor, and installed into the front wheel of the motor-assisted bicycle 1. The motor 105 rotates the front wheel, and also a rotor is connected to the front wheel so as to rotate according to the rotation of the front wheel. Furthermore, the motor 105 is equipped with a rotation sensor such as a hall sensor to output the rotation information (i.e. a hall signal) of the rotor to the motor driving control apparatus 102.

The motor driving control apparatus 102 performs predetermined operations based on signals from the rotation sensor of the motor 105, the brake sensor 107, the torque sensor 103, the pedal rotation sensor 104 and the like to control the driving of the motor 105 and also control the regeneration by the motor 105.

The control panel 106 accepts an instruction input regarding whether or not the assist is performed, for example, (i.e. ON or OFF of the power switch) and an input of a desired assist ratio and the like when the assist is performed, and outputs the instruction input and the like to the motor driving control apparatus 102. In addition, the control panel 106 may have a function to display data such as a travelling distance, a travelling time, a consumed calorie, an amount of regenerated power and the like, which are calculated by the motor driving control apparatus 102. Moreover, the control panel 106 may have a display unit such as LEDs (Light Emitting Diodes). With this configuration, for example, the charging level of the battery pack 101, a state of ON or OFF, a mode corresponding to the desired assist ratio and the like are presented for the rider.

The brake sensor 107 detects a braking operation of the rider to output a signal regarding the braking operation (e.g. a signal representing presence or absence of the braking operation) to the motor driving control apparatus 102. More specifically, the brake sensor 107 is a sensor using a magnet and a reed switch.

Figure 2:
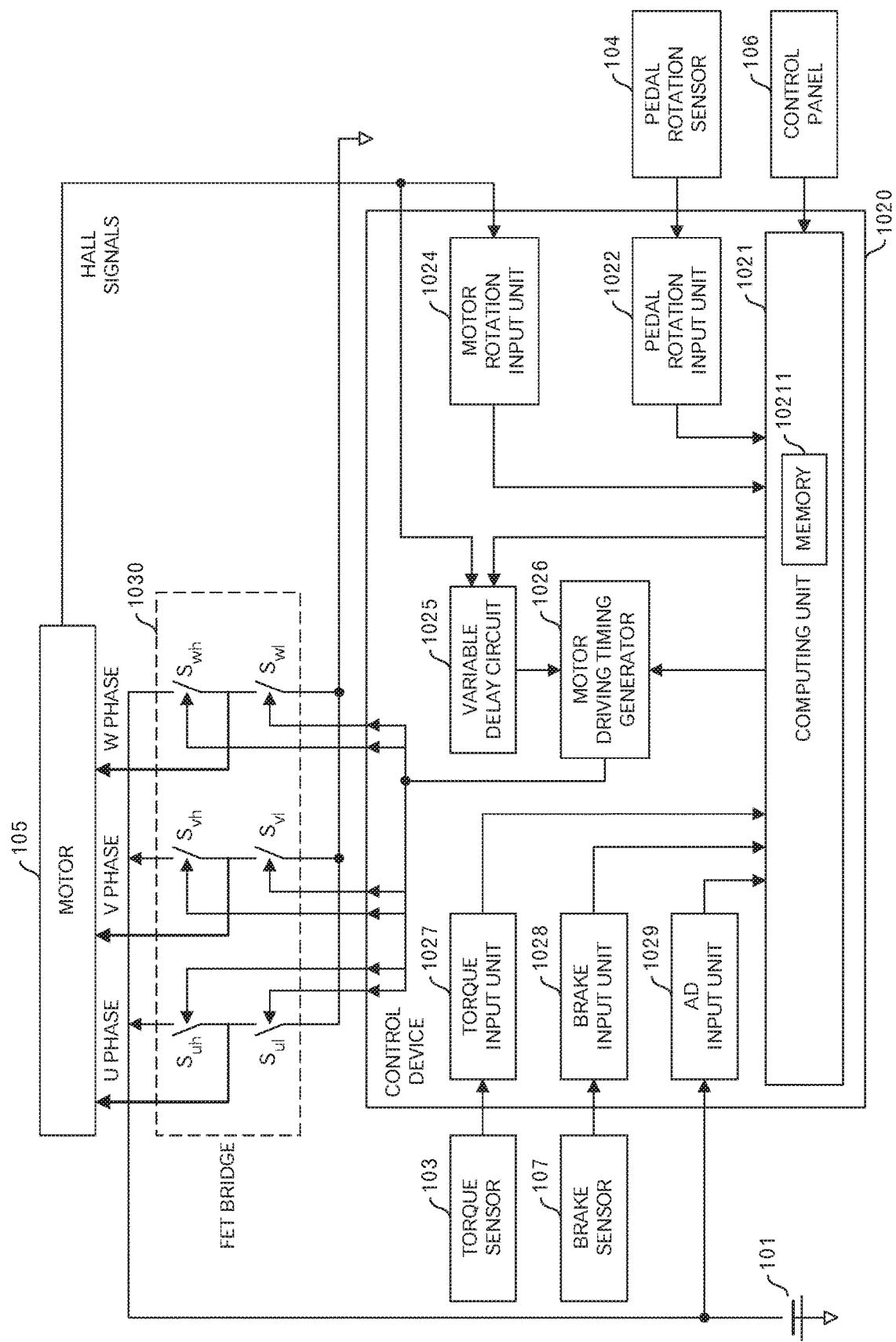
FIG. 2 is a diagram depicting a configuration example of a motor driving control apparatus.

FIG. 2 illustrates a configuration related to the motor driving control apparatus 102 of this motor-assisted bicycle 1. The motor driving control apparatus 102 includes a control device 1020 and a FET (Field Effect Transistor) bridge 1030 (i.e. an inverter). The FET bridge 1030 includes a high side FET (Suh) and a low side FET (Sul) to perform switching of a U phase of the motor 105, a high side FET (Svh) and a low side FET (Svl) to perform switching of a V phase of the motor 105, and a high side FET (Swh) and a low side FET (Swl) to perform switching of a W phase of the motor 105. This FET bridge 1030 is configured as a portion of the complementary type switching amplifier, and also configured as at least portion of the driving unit of the motor 105.

Moreover, the control device 1020 has a computing unit 1021, a pedal rotation input unit 1022, a motor rotation input unit 1024, a variable delay circuit 1025, a motor driving timing generator 1026, a torque input unit 1027, a brake input unit 1028, and an Analog-Digital (AD) input unit 1029.

The computing unit 1021 performs computation using an input (e.g. on/off of the assist) from the control panel 106, an input from the motor rotation input unit 1024, an input from the torque input unit 1027, an input from the brake input unit 1028, an input from the pedal rotation input unit 1022 and an input from the AD input unit 1029, and outputs results of the computation to the motor driving timing generator 1026 and the variable delay circuit 1025. The computing unit 1021 has a memory 10211, and the memory 10211 stores various data used for the computation, data during processing and the like. Furthermore, the computing unit 1021 may be realized by executing, by a processor, programs, and in such a case, the programs may be recorded in the memory 10211. Moreover, the memory 10211 may be provided, separately from the computing unit 1021.

The pedal rotation input unit 1022 digitizes a pedal rotation phase angle from the pedal rotation sensor 104 (also called as crank rotation phase angle. It may output a signal representing a rotation direction), and outputs the digitized pedal rotation phase angle to the computing unit 1021. The motor rotation input unit 1024 digitizes a signal regarding the rotation of the motor 105 based on the hall signal outputted by the motor 105 (in this embodiment, the rotation of the front wheel), and outputs the rotation data of the motor 105 to the computing unit 1021. The torque input unit 1027 digitizes a signal corresponding to a pedal force from the torque sensor 103, and outputs the pedal torque to the computing unit 1021. The brake input unit 1028 digitizes a signal representing presence or absence of the braking operation from the brake sensor 107, and outputs the data regarding presence or absence of the braking operation to the computing unit 1021. The AD input unit 1029 digitizes an output voltage from the rechargeable battery, and outputs the digitized output voltage to the computing unit 1021.

The computing unit 1021 outputs, as a computing result, a lead angle to the variable delay circuit 1025. The variable delay circuit 1025 adjusts a phase of the hall signal based on the lead angle received from the computing unit 1021, and outputs the adjusted hall signal to the motor driving timing generator 1026. The computing unit 1021 outputs a PWM (Pulse Width Modulation) code corresponding to a duty cycle of the PWM, for example, as the computing result, to the motor driving timing generator 1026. The motor driving timing generator 1026 generates and outputs switching signals for the respective FETs included in the FET bridges 1030, based on the adjusted hall signal from the variable delay circuit 1025 and the PWM code from the computing unit 1021. According to the computing result of the computing unit 1021, the motor 105 may be operated to appropriately perform the power driving or regenerative braking, The basic operation of the motor driving is described in WO 2012/086459 and the like, and is not a main portion of this embodiment. Therefore, the detailed explanation is omitted.

Figure 3:
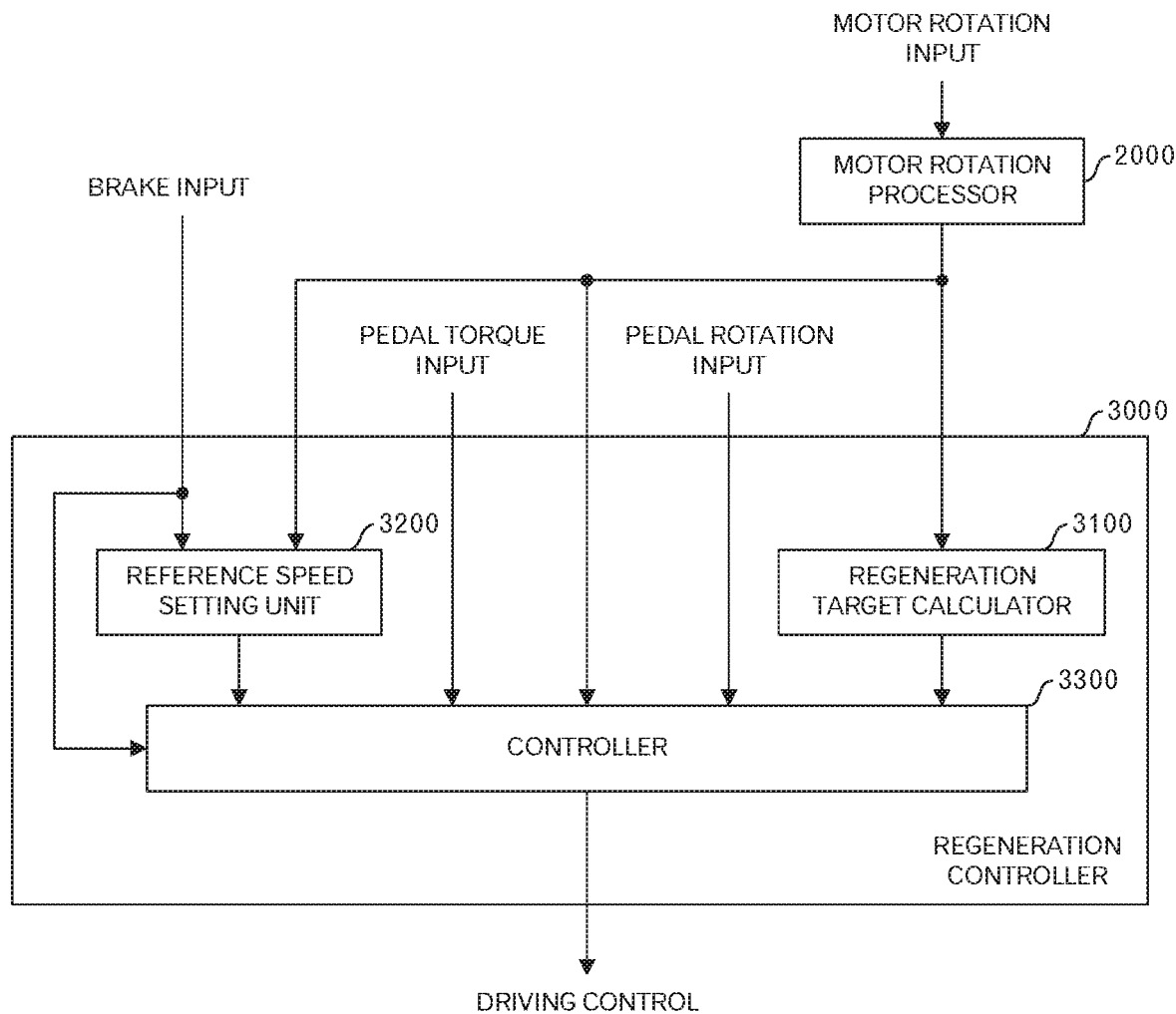
FIG. 3 is a diagram depicting a configuration example of a regeneration controller.

Next, FIG. 3 depicts a functional block configuration example (portions relating to this embodiment) associated with the regeneration controller 3000 in the computing unit 1021. The regeneration controller 3000 has a regeneration target calculator 3100, a reference speed setting unit 3200 and a controller 3300. The computing unit 1021 has a motor rotation processor 2000 that calculates a speed and an acceleration (an amount of temporal change in the speed) of the motor-assisted bicycle 1 from the motor rotation input from the motor rotation input unit 1024.

The regeneration target calculator 3100 specifies a regeneration target amount, which is predetermined according to the speed or acceleration, based on a current speed or acceleration, and outputs the regeneration target amount. The reference speed setting unit 3200 sets a reference speed that is a speed to be used as a reference on the regenerative control from the brake input from the brake input unit 1028 and the speed and acceleration from the motor rotation processor 2000.

The controller 3300 calculates a regeneration amount based on the brake input from the brake input unit 1028, the reference speed from the reference speed setting unit 3200, the speed and acceleration from the motor rotation processor 2000, a regeneration target amount from the regeneration target calculator 3100, a pedal rotation input from the pedal rotation input unit 1022 and a pedal torque input from the pedal torque input unit 1027, and performs the regenerative control according to the regeneration amount. In this embodiment, the controller 3300 determines a regeneration coefficient from the obtained data, multiplies the regeneration coefficient to the regeneration target amount and calculates the regeneration amount. The controller 3300 performs not only the regenerative control relating to this embodiment, but also the regenerative control based on other viewpoints. For example, the automatic regenerative control based on the acceleration or speed may be performed before a braking operation. In addition, the automatic regenerative control by a predetermined regeneration amount may be performed from a timing at which ON of the brake sensor 107 is detected to a timing at which OFF of the brake sensor 107 is detected.

When the regeneration is not performed, the computing unit 1021 drives the motor 105 through the motor driving timing generator 1026, the variable delay circuit 1025 and the FET bridge 1030 so as to perform the conventional powering driving. On the other hand, when the regeneration is performed, the computing unit 1021 regeneratively controls the motor 105 through the motor driving timing generator 1026, the variable delay circuit 1025 and the FET bridge 1030 so as to realize the regeneration amount outputted by the controller 3300.

This embodiment pays attention to a basic operation that the braking is performed when the speed increases and the user feels danger, for example, in case where running downhill. Namely, in case of the normal braking operation that is not a sudden braking, it is assumed that the speed of the motor-assisted bicycle 1 at a timing when the brake lever is released (when OFF of the brake sensor 107 is detected) instead of a timing when the braking is made (when ON of the brake sensor 107 is detected) is the speed that the user felt preferable, and the increase of the speed is suppressed using, as a reference, the speed. On the other hand, when the sudden braking is made, it is assumed that the speed of the motor-assisted bicycle 1 at a timing when the braking is made instead of the speed of the motor-assisted bicycle 1 at a timing when the brake lever is released is the speed intended by the user, and the increase of the speed is suppressed using, as a reference, the speed.

By the regenerative braking that occurs by the aforementioned regenerative control, it is possible to reduce the frequency and time period of the braking operations by the user and reduce the troubles of the user, and also increase a charging amount for the battery. Furthermore, because the regeneration amount is controlled so as to realize the running state according to the user's intention, the comfortable travelling is realized.

Next, processing contents of the regeneration controller 3000 depicted in FIG. 3 will be explained by using FIGS. 4 to 9.

First, the reference speed setting unit 3200 determines, from the brake input from the brake input unit 1028, whether or not the brake was changed from OFF to ON (step S1). When it is determined that the brake was changed from OFF to ON (step S1: Yes route), the reference speed setting unit 3200 sets, as a first reference candidate speed V1, a current speed from the motor rotation processor 2000 (step S3). Then, the processing shifts to a processing in FIG. 5 through a terminal A.

On the other hand, when it is determined that the brake was not changed from OFF to ON (step S1: No route), the reference speed setting unit 3200 determines, from the brake input from the brake input unit 1028, whether or not the brake was changed from ON to OFF (step S5). When it is determined that the brake was not changed from ON to OFF (step S5: No route), the processing shifts to the processing of FIG. 5 through the terminal A. On the other hand, when it is determined the brake was changed from ON to OFF (step S5: Yes route), the reference speed setting unit 3200 sets, as a second reference candidate speed V2, a current speed from the motor rotation processor 2000 (step S7). Furthermore, the reference speed setting unit 3200 sets ON (which represents that the brake was changed from ON to OFF) for a first flag that represents whether or not the brake was changed from ON to OFF (step S9). Then, the processing shifts to the processing of FIG. 5 through the terminal A.

Figure 5:
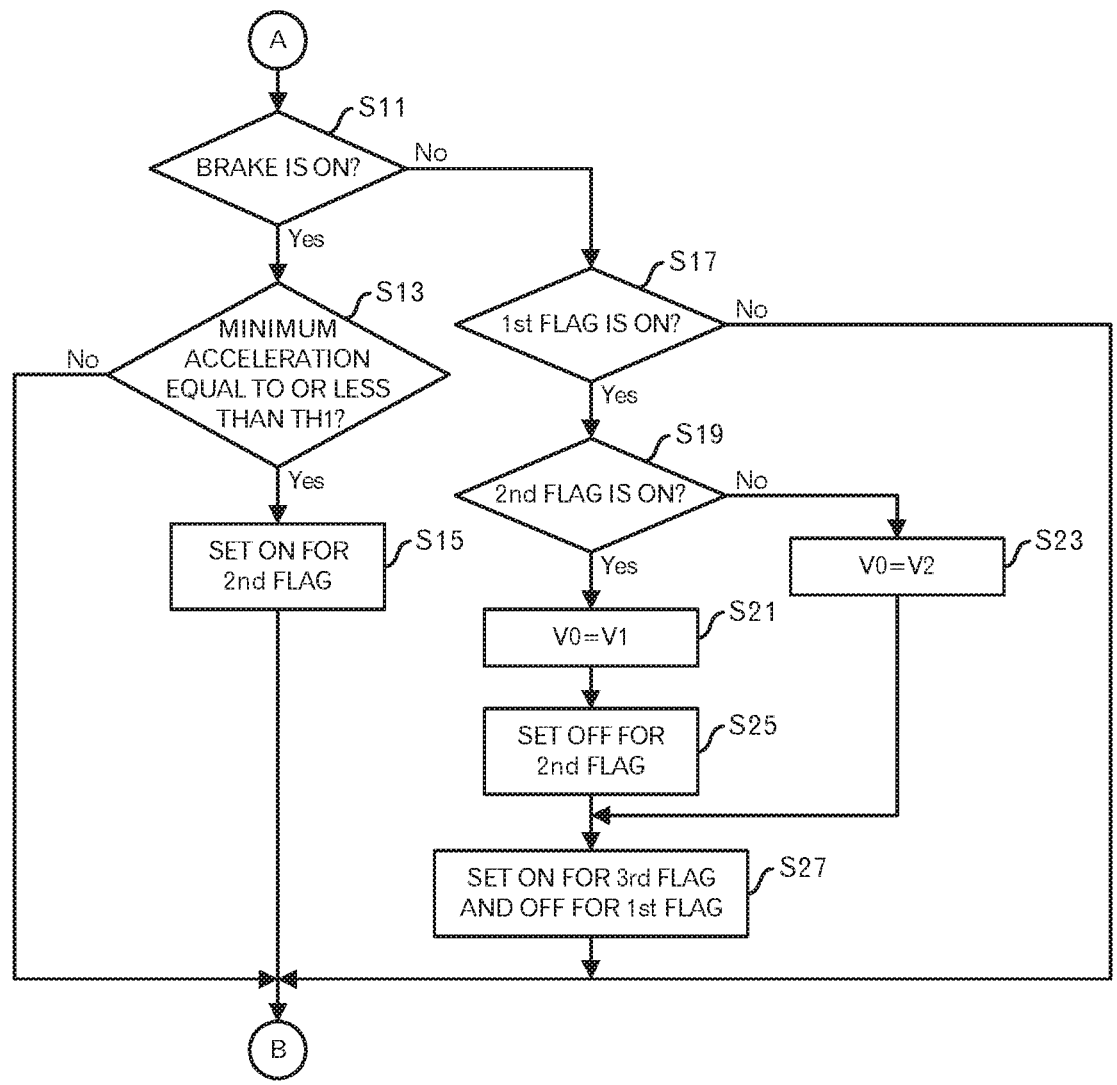
FIG. 5 is a diagram depicting a processing flow in the first embodiment.

Shifting to the explanation of the processing of FIG. 5, the reference speed setting unit 3200 determines, from the brake input from the brake input unit 1028, whether or not the brake has been ON (step S11). When the brake has been ON (step S11: Yes route), the reference speed setting unit 3200 determines whether or not the minimum acceleration (which is a negative value and has the maximum absolute value) among the accelerations from the motor rotation processor

2000 after it is detected that the brake changed from OFF to ON is equal to or less than a threshold TH1 (<0) for detecting the sudden braking (step S13). In this embodiment, the presence or absence of the sudden braking is determined based on the acceleration, however, it may be determined also by taking into consideration a time period from a timing when the brake was changed to ON to a timing when the acceleration reaches the minimum acceleration.

When the condition at the step S13 is not satisfied (step S13: No route), the processing shifts to a processing of FIG. 6 through a terminal B. On the other hand, when it is determined that the minimum acceleration after it is detected that the brake was changed from OFF to ON is equal to or less than the threshold TH1 for detecting the sudden braking (step S13: Yes route), the reference speed setting unit 3200 sets ON (which represents the presence of the sudden braking) for a second flag representing the presence or absence of the sudden braking (step S15). Then, the processing shifts to the processing of FIG. 6 through the terminal B.

When it is determined at the step S11, that the brake is not ON, namely, the brake is OFF (step S11: No route), the reference speed setting unit 3200 determines whether or not the first flag that represents whether or not the brake was changed from ON to OFF is ON (step S17). When the first flag is OFF (step S17: No route), the processing shifts to the processing of FIG. 6 through the terminal B. On the other hand, when the first flag is ON (step S17: Yes route), the reference speed setting unit 3200 determines whether or not the second flag that represents the presence or absence of the sudden braking is ON (step S19). When the second flag is OFF (step S19: No route), the reference speed setting unit 3200 sets, as the reference speed V0, the second reference candidate speed V2 (step S23). In other words, the speed at a timing when the brake was changed to OFF is set as the reference speed. Then, the reference speed setting unit 3200 outputs the reference speed V0 to the controller 3300. After that, the processing shifts to step S27.

On the other hand, when the second flag is ON (step S19: Yes route), the reference speed setting unit 3200 sets, as the reference speed V0, the first reference candidate speed V1 (step S21). In other words, the speed at a timing when it is detected that the brake was changed to ON is set as the reference speed. In addition, the reference speed setting unit 3200 outputs the reference speed V0 to the controller 3300. Then, the reference speed setting unit 3200 sets OFF for the second flag (step S25). This is for next detection of the sudden braking. Furthermore, the reference speed setting unit 3200 sets ON for a third flag for enabling the regenerative control based on the reference speed, and sets OFF for the first flag that represents whether or not the brake was changed from ON to OFF (step S27). OFF of the first flag is to provide for the next baking operation. After that, the processing shifts to the processing of FIG. 6 through the terminal B.

Figure 6:
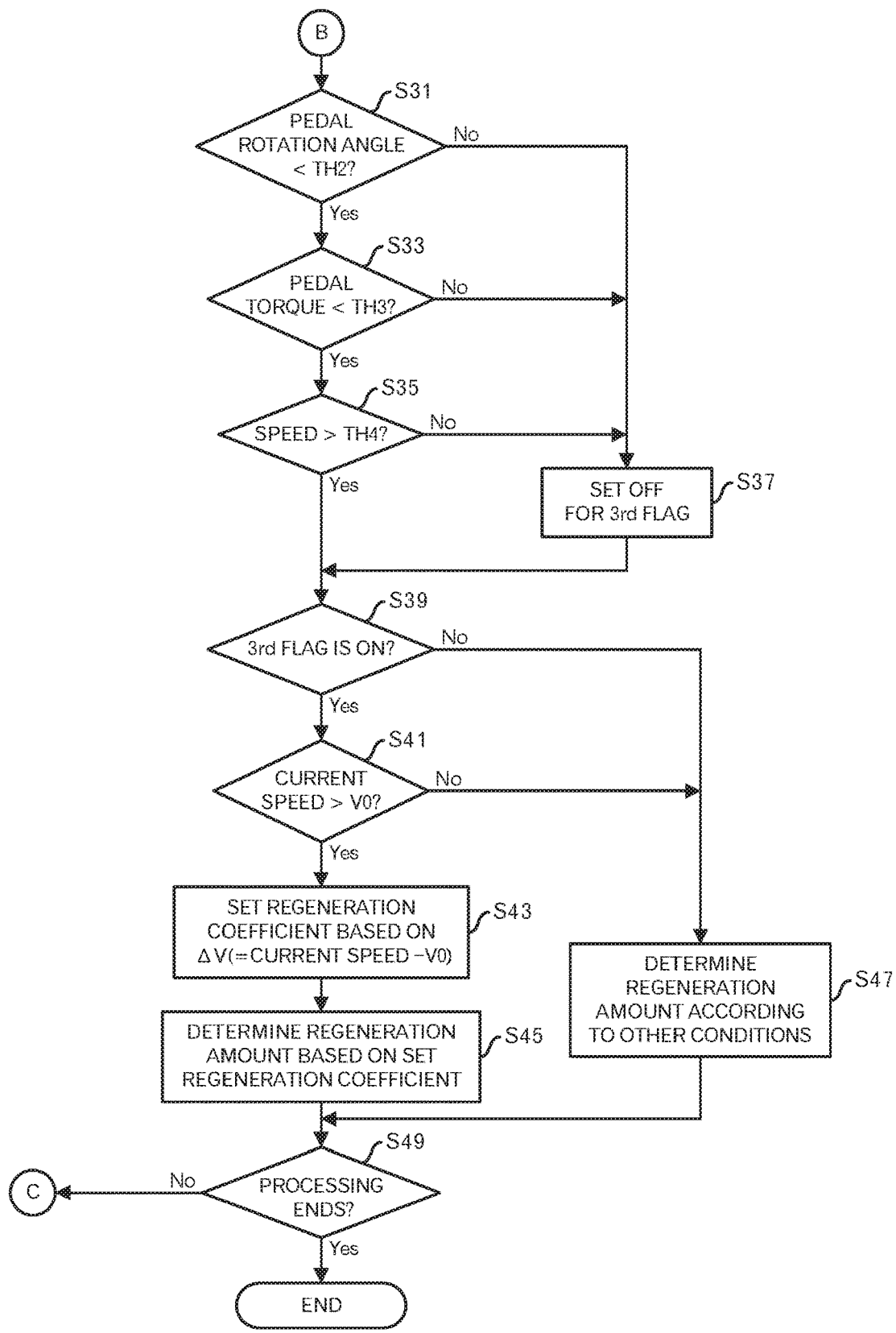
FIG. 6 is a diagram depicting a processing flow in the first embodiment.

Shifting to the explanation of the processing of FIG. 6, the controller 3300 determines whether or not a pedal rotation angle (e.g. a pedal rotation angle within a unit time period immediately before the present time) specified from the pedal rotation input from the pedal rotation input unit 1022 is less than a threshold TH2 (step S31). When the user intentionally rotates the pedal, it is inappropriate to perform this regenerative control. When the condition at the step S31 is not satisfied (step S31: No route), the controller 3300 sets OFF for the third flag for enabling the regenerative control based on the reference speed (step S37). Then, the processing shifts to step S39.

On the other hand, when the pedal rotation angle is less than the threshold TH2 (step S31: Yes route), the controller 3300 determines whether or not the pedal torque input from the torque input unit 1027 is less than a threshold TH3 (step S33). This is because it is inappropriate to perform this regenerative control when the user intentionally pedals to perform the pedal torque input. When the condition at the step S33 is not satisfied (step S33: No route). The processing shifts to step S37. On the other hand, when the pedal torque input is less than the threshold TH3 (step S33: Yes route), the controller 3300 determines whether or not the current speed from the motor rotation processor 2000 exceeds a threshold TH4 (step S35). This is because it is inappropriate to perform this regenerative control when the bicycle is not running at a certain speed or more. When the current speed is equal to or less than the threshold TH4 (step S35: No route), the processing shifts to the step S37.

When the current speed exceeds the threshold TH4 (step S35: Yes route), the controller 3300 determines whether or not the third flag is ON (step S39). When the third flag is OFF (step S39: No route), it is inappropriate to perform the regenerative control relating to this embodiment. Therefore, the controller 3300 determines a regeneration amount (which may be zero) according to other conditions, and cause the FET bridge 1030 and the like to perform the regenerative braking of the motor 105 according to the regeneration amount (step S47). Then, the processing shifts to step S49.

On the other hand, when the third flag is ON (step S39: Yes route), the controller 3300 determines whether or not the current speed from the motor rotation processor 2000 exceeds the reference speed V0 (step S41). In this embodiment, the speed is suppressed by the regenerative braking when the current speed exceeds the reference speed V0. Therefore, when the current speed is equal to or less than the reference speed V0, the regenerative control relating to this embodiment is not performed. However, a regeneration coefficient less than the current regeneration coefficient may be used to perform the regenerative control.

Figure 7:
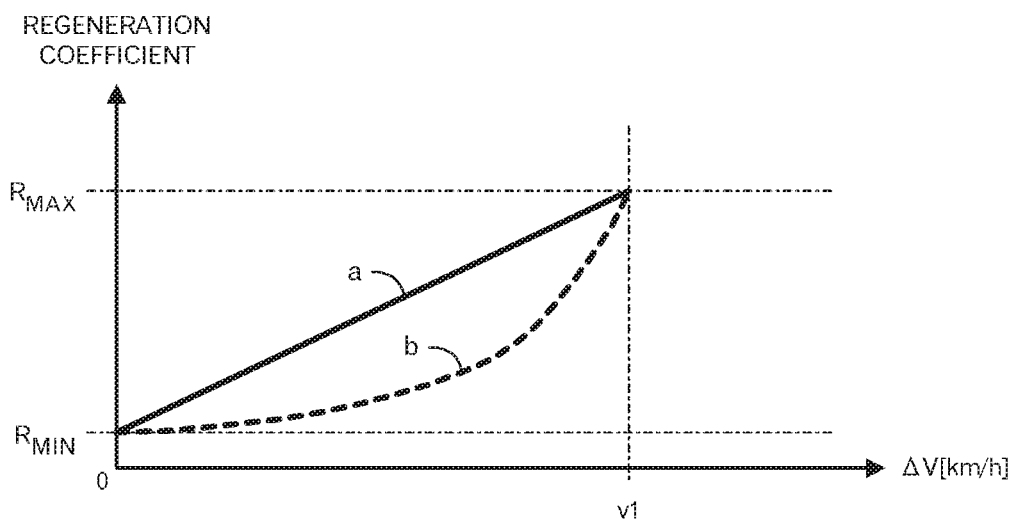
FIG. 7 is a diagram depicting an example of a relationship between ΔV and a regeneration coefficient.

In this embodiment, when the current speed is equal to or less than the reference speed V0 (step S41: No route), the processing shifts to the step S47. On the other hand, when the current speed exceeds the reference speed V0, the controller 3300 sets a regeneration coefficient based on $\Delta V$ (=current speed−V0) (step S43). For example, a relationship (e.g. correspondence) between $\Delta V$ and the regeneration coefficient [%] is predefined. An example of the relationship is depicted in FIG. 7. In the example of FIG. 7, a vertical axis represents the regeneration coefficient [%] and a horizontal axis represents $\Delta V$ [km/h]. For example, a straight line "a" that the regeneration coefficient at $\Delta V=0$ is $R_{MIN}$ (which may be zero or may be a value greater than zero), and the regeneration coefficient at $\Delta V=v1$ (predetermined value) is $R_{MAX}$ (which may be 100 or may be a value less than 100) may be employed for the relationship. In addition, a curve "b" of an exponential function that the regeneration coefficient at $\Delta V=0$ is $R_{MIN}$ (which may be zero or may be a value greater than zero), and the regeneration coefficient at $\Delta V=v1$ (predetermined value) is $R_{MAX}$ (which may be 100 or may be a value less than 100) may be employed for the relationship. Another curve represented by another function may be employed. Moreover, the regeneration coefficient may be determined based on another indicator including a term (current speed−V0) instead of the simple $\Delta V$.

When the determined regeneration coefficient is employed as it is, a shock due to a large acceleration change is provided for the user. Therefore, it is also performed to control so as to gradually increase the regeneration coefficient up to the determined regeneration coefficient since a timing when it was detected that the brake was changed to OFF.

The controller 3300 determines a regeneration amount by multiplying the regeneration coefficient to the current regeneration target amount outputted from the regeneration target calculator 3100, and performs the regenerative control according to the regeneration amount (step S45). Then, the processing shifts to step S49.

The processing from the step S1 to S47 is repeated until the end of the processing is instructed by the user or the like (step S49). When the end of the processing is not instructed, the processing returns to the step S1 in FIG. 4 through a terminal C. On the other hand, when the end of the processing is instructed, the processing ends. The steps S1 to S47 are executed for each unit time period.

By performing the aforementioned processing, it becomes possible to perform the regenerative control based on the reference speed presumed as the user's intention, which appears in the braking operation.

Figure 8:
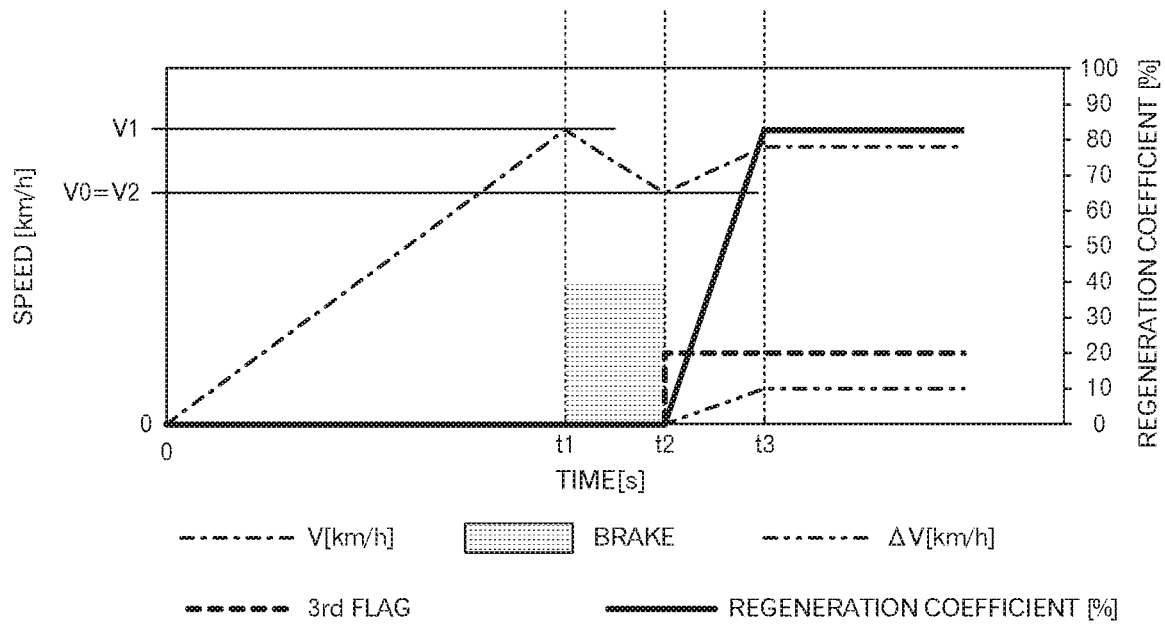
FIG. 8 is a diagram to explain a control example by the first embodiment.

Next, an example of the regenerative control relating to this embodiment will be explained by using FIGS. 8 and 9. FIG. 8 depicts a case where the normal braking operation is performed. In FIG. 8, the vertical axis on the right side represents the speed, the vertical axis on the left side represents the regeneration coefficient, and the horizontal axis represents the time [s].

In the example of FIG. 8, a case of running downhill is assumed, for example, and the speed V represented by a dash-dotted line gradually increases. At time t1, the user felt danger and applies the brake, and the brake sensor 107 outputs ON. The speed at the time t1 is the first reference candidate speed V1. After that, while the brake sensor 107 outputs ON, the motor-assisted bicycle 1 reduces the speed, and at time t2, the user releases the brake because the speed is sufficiently reduced, and the brake sensor 107 outputs OFF. The speed at the time t2 is the second reference candidate speed V2. In this example, no sudden braking is detected. Therefore, the reference speed V0 is equal to V2.

When the reference speed V0=V2 is set at the time t2, ON is set for the third flag as represented by a thick dotted line, and the regenerative control relating to this embodiment starts. However, because the regeneration coefficient is zero up to the time t2 in this regenerative control relating to this embodiment, the speed V increases again when the brake is released at the time t2. In addition, in this regenerative control relating to this embodiment, the regeneration coefficient according to ΔV (=current speed−V0) is set, however, the speed V gradually increases up to time t3 in this example. Therefore, ΔV, which is represented by a two-dot chain line, also gradually increases, and the regeneration coefficient increases according to ΔV. At the time t3, the increase of the speed V is suppressed to a constant speed, and ΔV becomes a constant value. Therefore, the regeneration coefficient is kept to be a constant value.

By the aforementioned processing, the regeneration coefficient according to a deviation degree of the current speed from the reference speed V0=V2 is set and the increase of the speed is suppressed. As described above, the regeneration may be performed based on the acceleration and the like up to the time t1. Moreover, the regeneration may be performed according to ON of the brake sensor 107 also during a time period from the time t1 to the time t2, which is a time period during the ON of the brake sensor 107.

In addition, in this example, the regeneration coefficient is kept to be a certain value because the current coefficient, the speed and ΔV are balanced. However, depending on the state of the downhill, the speed may decrease, ΔV also may decrease, and the regeneration coefficient also may gradually decrease. Similarly, the speed may increase again, ΔV also may increase and the regeneration coefficient also may gradually increase.

Figure 9:
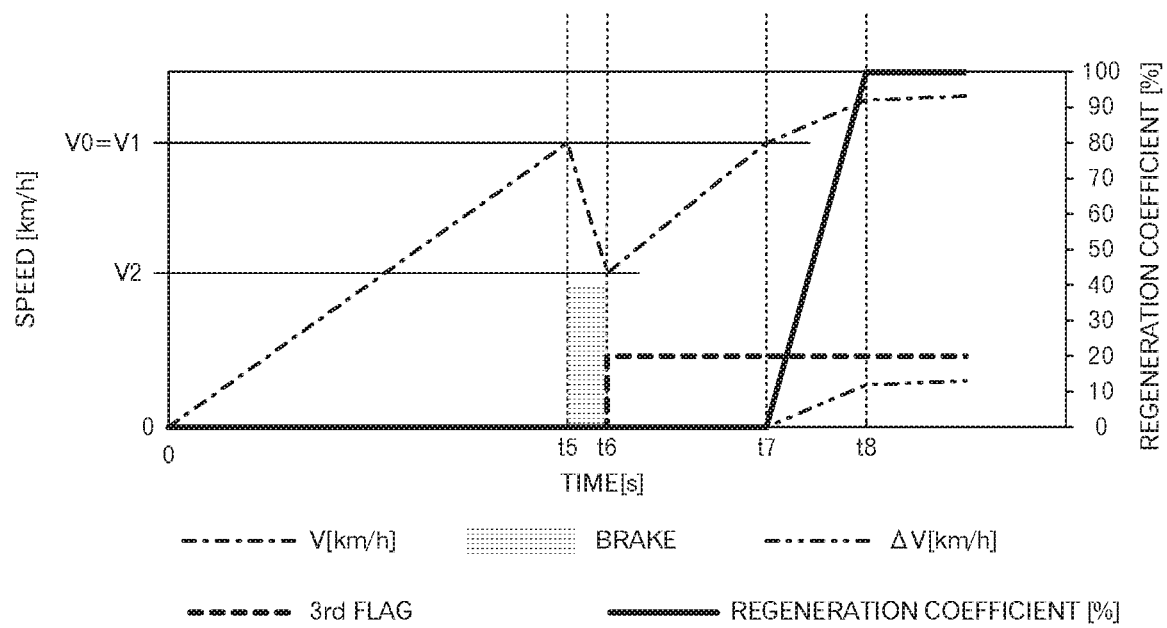
FIG. 9 is a diagram to explain a control example by the first embodiment.

Moreover, FIG. 9 depicts a case where the sudden braking is performed. In FIG. 9, the vertical axis on the right side represents the speed, the vertical axis on the left side represents the regeneration coefficient, and the horizontal axis represents the time.

The example of FIG. 9 also assumes a case of running downhill, for example, and the speed V represented by a dash dotted line gradually increases. At time t5, the user feels danger and brakes suddenly, and the brake sensor 107 outputs ON. The speed at the time t5 is the first reference candidate speed V1. Because of the sudden braking, the motor-assisted bicycle 1 rapidly decreases the speed while the brake sensor 107 outputs ON, the user releases the brake at time t6, and the brake sensor 107 outputs OFF. The speed at the time t6 is the second reference candidate speed V2. In this example, because this is an example of the sudden braking, the reference speed V0 is equal to V1.

When the reference speed V0=V1 is set at the time t6, ON is set for the third flag as illustrated by a thick dotted line, and the regenerative control relating to this embodiment starts. However, in the regenerative control relating to this embodiment, the regeneration coefficient is 0 up to the time t6. Therefore, when the brake is released at the time t6, the speed V increases again.

In the example of FIG. 8, because the speed when the brake sensor 107 outputs OFF is the reference speed, the current speed becomes greater than V0 soon. However, in the example of FIG. 9, because of V2<V1, the value of the regeneration coefficient is not determined soon. When the speed reaches V1 (=V0) again at time t7, the regeneration coefficient according to ΔV (=current speed−V0) is set in this regenerative control relating to this embodiment. However, because ΔV gradually increases from 0, the regeneration coefficient also gradually increases as illustrated by the thick solid line.

At or after the time t7 in this example, the speed V gradually increases. Therefore, ΔV, which is represented by two-dot chain lined, also gradually increases. However, the regeneration coefficient also increases, the increase of the speed is suppressed compared with the increase of the speed before the time t7. However, because the regeneration coefficient reaches 100%, which is an upper limit, at time t8, the regenerative braking does not increases any more. Therefore, at or after the time t8, the increase of the speed is suppressed compared with that before the time t8, however, ΔV also increases.

By the aforementioned processing, the regeneration coefficient according to the deviation degree of the current speed from the reference speed V0=V1 is set, and the increase of the speed is suppressed. However, when the regeneration coefficient reaches the upper limit, no further regeneration braking is performed. Therefore, the sufficient reduction of the speed is not performed, and the braking operation may be performed again. The next braking operation may be determined as the normal braking operation.

As for three conditions of the steps S31 to S35 in FIG. 6, at least one of them may be sufficient instead of all checks. In addition, instead of checking them in this order, they may be checked in different order or in parallel.

Modification of the Embodiment 1

In the first embodiment, the relationship between ΔV and the regeneration coefficient is predetermined, and the regeneration coefficient corresponding to the current ΔV is identified. However, a relationship between the acceleration and the regeneration coefficient may be predetermined, and the regeneration coefficient corresponding to the current acceleration may be identified.

Figure 10:
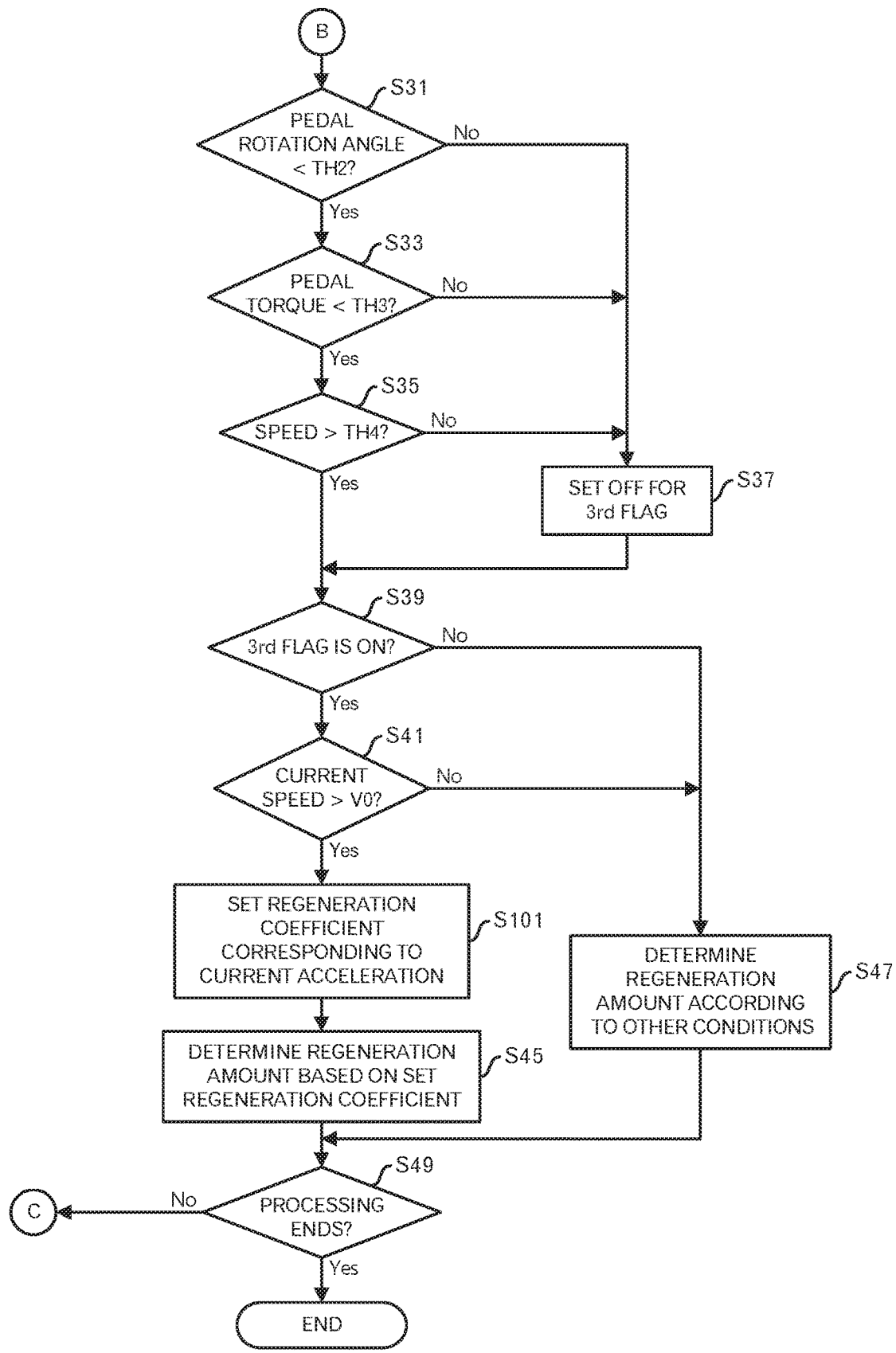
FIG. 10 is a diagram depicting a processing flow in a modification of the first embodiment.

Namely, the processing of FIG. 6 is replaced with a processing of FIG. 10.

Also in FIG. 10, the same step numbers are attached to the same processing as in FIG. 6. A specific modified portion is a portion that the step S43 in FIG. 6 is replaced with step S101.

In this embodiment, at the step S101, the controller 3300 sets the regeneration coefficient corresponding to the current acceleration from the motor rotation processor 2000. For example, the relationship between the acceleration and the regeneration coefficient is predetermined, and the regeneration coefficient corresponding to the current acceleration is identified. More specifically, the relationship as illustrated in FIG. 11 is predetermined.

Figure 11:
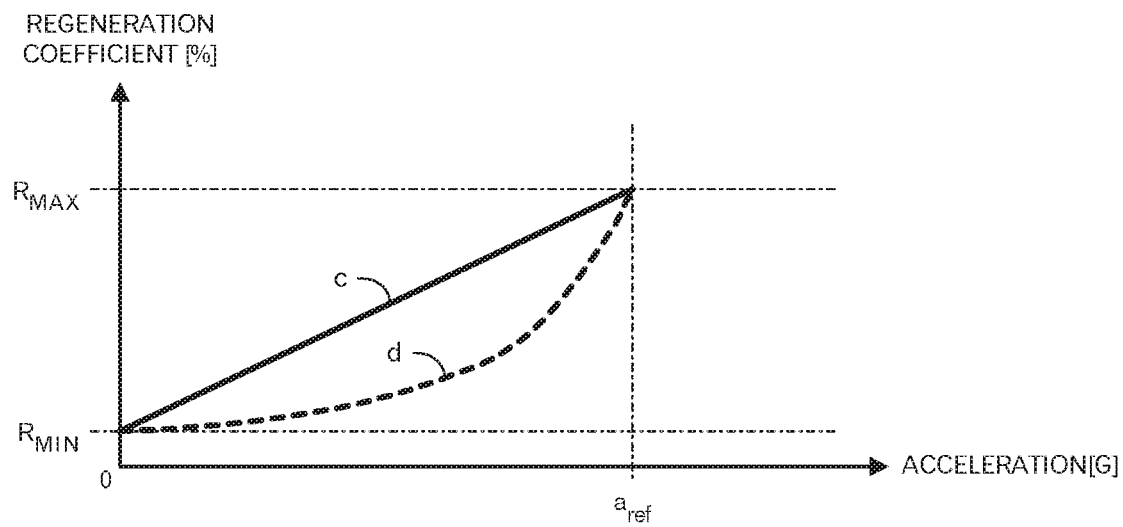
FIG. 11 is a diagram depicting an example of a relationship between the acceleration and the regeneration coefficient.

In the example of FIG. 11, the vertical axis represents the regeneration coefficient [%], and the horizontal axis represents the acceleration [G]. Here, the relationship may be employed that is represented by a straight line "c" that the regeneration coefficient at the acceleration=0 is $R_{MIN}$ (which may be zero or may be a value greater than 0) and the regeneration coefficient at the acceleration $a_{ref}$ is $R_{MAX}$ (which may be 100 or may be a value less than 100). In addition, the relationship may be employed that is represented a curve "d" of an exponential function that the regeneration coefficient at the acceleration=0 is $R_{MIN}$ (which may be zero or may be a value greater than 0) and the regeneration coefficient at the acceleration $a_{ref}$ is $R_{MAX}$ (which may be 100 or may be a value less than 100). The relationship may be represented by a curve of another function.

Also in this embodiment, when the current speed is greater than the reference speed, the regeneration amount according to the current acceleration is determined to perform the regenerative control. Therefore, the increase of the speed is suppressed, and the charging amount increases. Moreover, it becomes possible to perform the regenerative control based on the reference speed presumed as the user's intention which appears in the braking operation.

Embodiment 2

In the first embodiment and its modification, the braking operation by the user is grasped only by using the brake sensor 107. However, the cost increases by the brake sensor 107. In this embodiment, a processing in case where the braking operation is estimated without using the brake sensor 107 will be explained.

Figure 4:
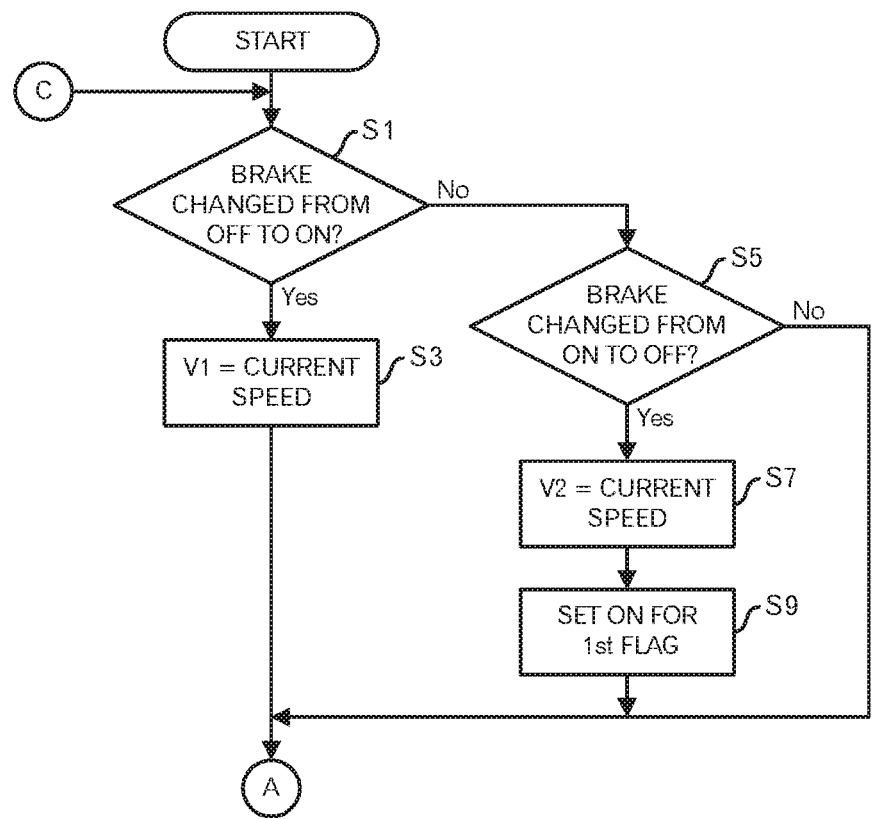
FIG. 4 is a diagram depicting a processing flow in a first embodiment.
Figure 12:
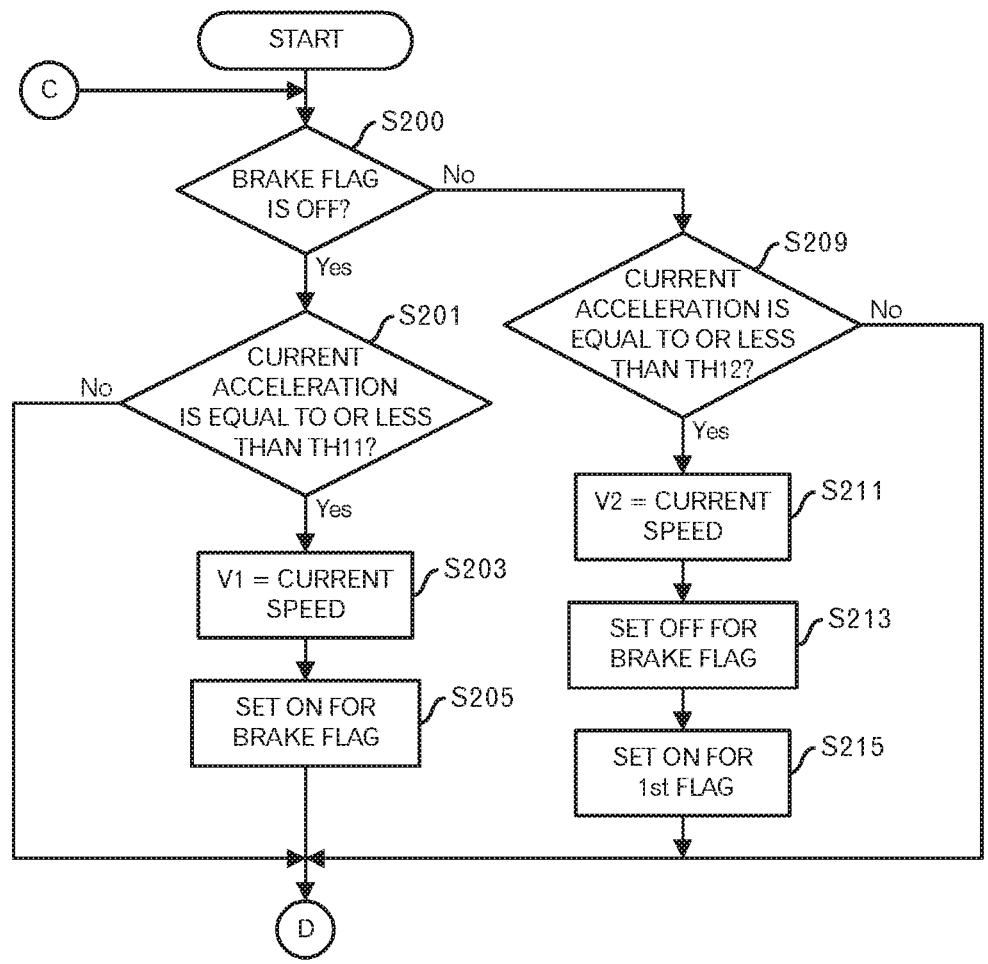
FIG. 12 is a diagram depicting a processing flow in a second embodiment.
Figure 13:
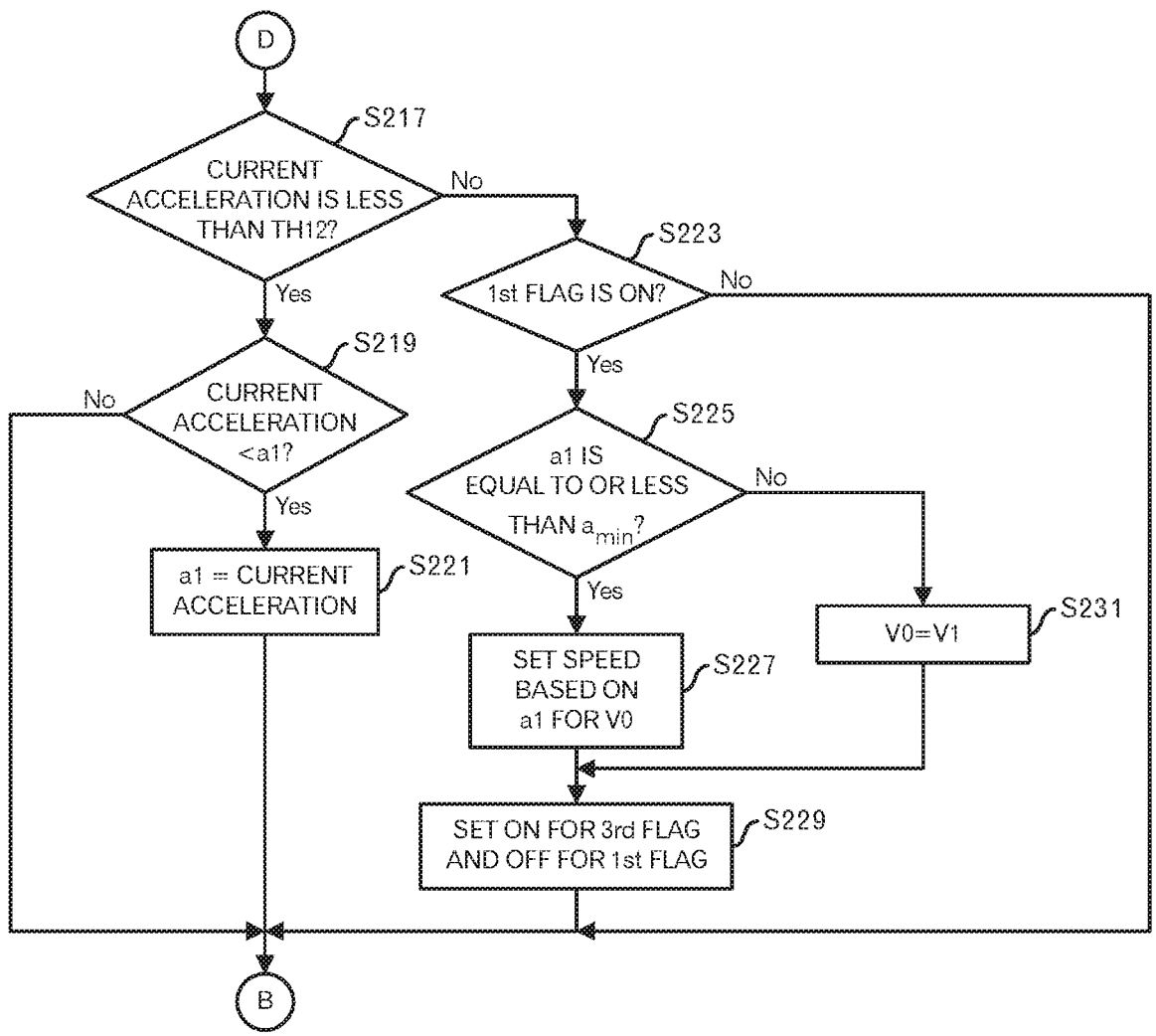
FIG. 13 is a diagram depicting a processing flow in the second embodiment.

In this embodiment, a processing of FIG. 12 instead of FIG. 4 is performed and a processing of FIG. 13 instead of FIG. 5 is performed among FIGS. 4 to 6 in the first embodiment. The explanation of the processing of FIG. 6 is omitted, because the processing contents are the same.

First, the processing of FIG. 12 is explained.

The reference speed setting unit 3200 determines whether or not a brake flag that represents an estimation result of the presence or absence of the braking operation is OFF (step S200). When the brake flag is OFF, namely, this is a state where no braking operation is estimated (step S200: Yes route), the reference speed setting unit 3200 determines whether or not the current acceleration from the motor rotation processor 2000 is equal to or less than a threshold TH11 (step S201). The threshold TH11 is a preset threshold to detect ON of the brake.

Figure 14:
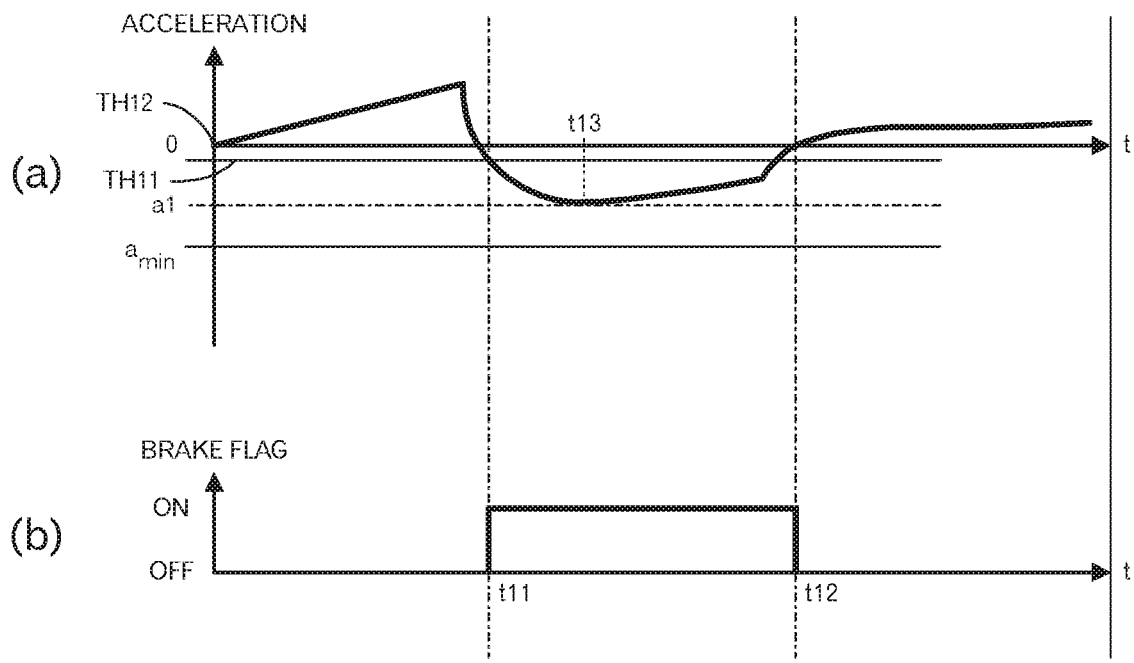
FIG. 14 is a diagram to explain temporal changes in the acceleration and the brake flag in case of a normal braking operation.

An example of temporal change in the acceleration in case where the normal braking operation is performed is depicted in FIG. 14. (a) in FIG. 14 represents the temporal change in the acceleration, and (b) in FIG. 14 represents the temporal change of ON/OFF of the brake flag. For example, the threshold TH11 is −50 mG, and a threshold TH12 is 0, for example. After the acceleration increases for a short time, the acceleration becomes equal to or less than the threshold TH11 at time t11. Therefore, the brake flag becomes ON. After that, the acceleration decreases exponentially up to time t13, and the acceleration becomes minimum at the time t13. The minimum acceleration is denoted by a1. The minimum acceleration is different for each braking operation and is a negative acceleration whose absolute value is maximum. After the time t13, the acceleration gradually increases, and after that, the acceleration rapidly increases. At time t12, the acceleration becomes equal to or greater than the threshold TH12, and the brake flag becomes OFF. The acceleration $a_{min}$ is a threshold to determine the sudden braking in this embodiment and is preset.

When the current acceleration is equal to or less than the threshold TH11 (step S201: Yes route), the reference speed setting unit 3200 sets the current speed from the motor rotation processor 2000 for the first reference candidate speed V1 (step S203). In addition, the reference speed setting unit 3200 sets ON for the brake flag (step S205). After that, the processing shifts to the processing of FIG. 13 through terminal D.

On the other hand, when the current acceleration exceeds the threshold TH11 (step S201: No route), the processing shifts to the processing of FIG. 13 through the terminal D. With this processing, only when the brake flag is OFF and the current acceleration is equal to or less than the threshold TH11, the processing shifts to the step S203. On the other hand, when the brake flag is not OFF, namely, the brake flag is ON and the braking operation is estimated (step S200: No route), the reference speed setting unit 3200 determines whether or not the current acceleration is equal to or greater than the threshold TH12 (step S209). The threshold TH12 is a preset threshold to detect OFF of the brake.

When the current acceleration is less than the threshold TH12 (step S209: No route), the processing shifts to the processing of FIG. 13 through the terminal D. On the other hand, when the current acceleration is equal to or less than the threshold TH12 (step S209: Yes route), the reference speed setting unit 3200 sets the current speed as the second reference candidate speed V2 (step S211). Moreover, the reference speed setting unit 3200 sets OFF for the brake flag (step S213). This is for later processing. Furthermore, the reference speed setting unit 3200 sets ON (i.e. the brake was changed from ON to OFF) for the first flag representing whether or not the brake was changed from ON to OFF (step S215). Then, the processing shifts to the processing of FIG. 13 through the terminal D.

Shifting to the explanation of the processing of FIG. 13, the reference speed setting unit 3200 determines whether or not the current acceleration is less than the threshold TH12 (step S217). Namely, it is determined whether or not the brake is still ON. When the current acceleration is less than the threshold TH12 (step S217: Yes route), the reference speed setting unit 3200 determines whether or not current acceleration is less than the minimum acceleration a1 up to this timing (step S219). The initial value of the minimum acceleration a1 is 0, for example. When the condition of the step S219 is not satisfied (step S219: No route), the minimum acceleration a1 is not updated, and the processing shifts to the processing of FIG. 6 through the terminal B.

On the other hand, when the current acceleration is less than the minimum acceleration a1 up to this timing (step S219: Yes route), the reference speed setting unit 3200 sets the current acceleration as the minimum acceleration a1 (step S221). Then, the processing shifts to the processing of FIG. 6 through the terminal B.

When it is determined at the step S217 that the current acceleration is equal to or greater than the threshold TH12 (step S217: No route), the reference speed setting unit 3200 determines whether or not the first flag that represents whether or not the brake was changed from ON to OFF is ON (i.e. the brake was changed from ON to OFF) (step S223). When the first flag is OFF (step S223: No route), the processing shifts to the processing of FIG. 6 through the terminal B.

On the other hand, when the first flag is ON (step S223: Yes route), the reference speed setting unit 3200 determines whether or not the minimum acceleration a1 is equal to or greater than the threshold $a_{min}$ to determine the sudden braking (step S225).

Figure 15:
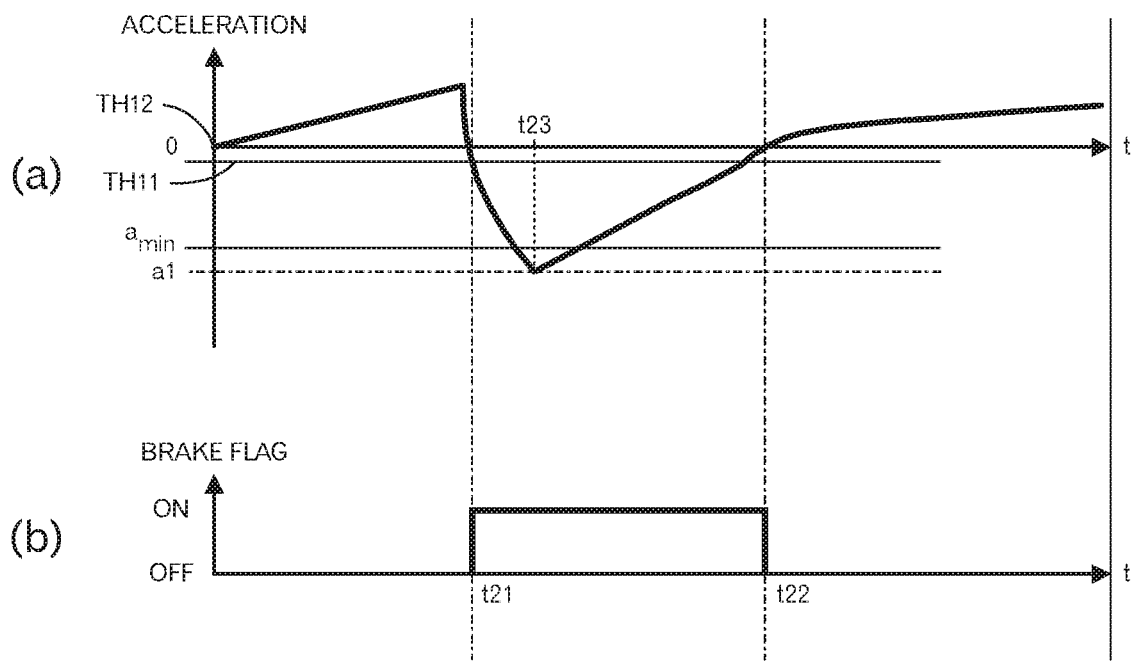
FIG. 15 is a diagram to explain temporal changes in the acceleration and the brake flag in case of a sudden braking.

An example of temporal change in the acceleration in case where the sudden braking is performed is depicted in FIG. 15. (a) in FIG. 15 represents the temporal change in the acceleration, and (b) represents temporal change of ON/OFF of the brake flag. Similarly to FIG. 14, for example, the threshold TH11 is −50 mG, and the threshold TH12 is 0, for example. After the acceleration increases for a short time, the acceleration is equal to or less than the threshold TH11 at time t21. Therefore, the brake flag becomes ON. After that, the acceleration rapidly decreases up to time t23, and the acceleration becomes minimum at the time t23. In this example, the minimum acceleration a1 is less than the threshold $a_{min}$ to determine the sudden braking. After the time t23, the acceleration gradually increases, and after the time t22, the acceleration becomes a positive value. Then, the brake flag becomes OFF.

Thus, when the minimum acceleration a1 is less than the threshold $a_{min}$ and it is determined that the sudden braking occurred (step S225: No route), the reference speed setting unit 3200 sets the first reference candidate speed V1 for the reference speed V0 (step S231). Then, the processing shifts to step S229.

On the other hand, when the minimum acceleration a1 is equal to or greater than the threshold $a_{min}$ (step S225: Yes route), the reference speed setting unit 3200 sets a speed based on the minimum acceleration a1 for the reference speed V0 (step S227). A specific example of this step is explained by using FIG. 16.

Figure 16:
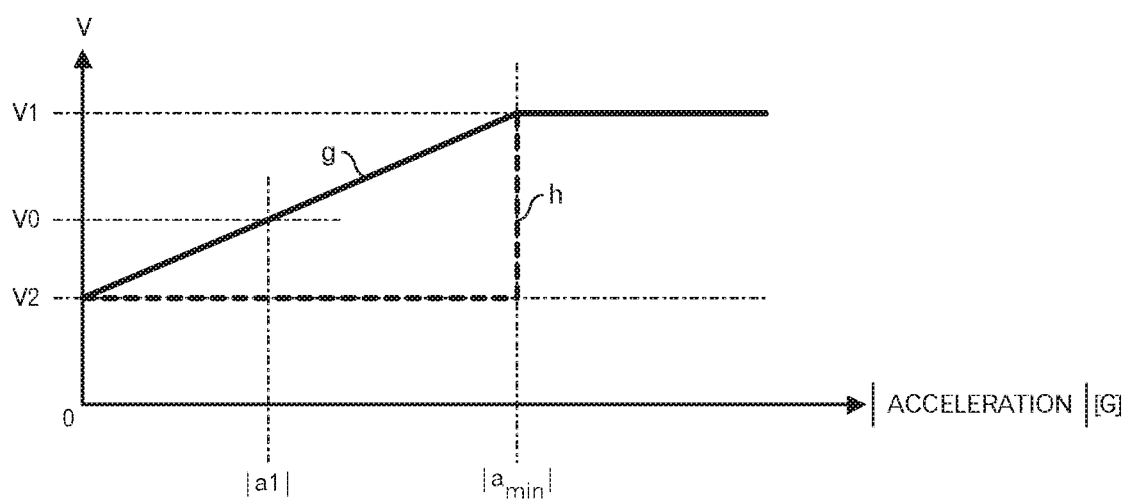
FIG. 16 is a diagram depicting an example of a relationship between the acceleration and the speed.

In this embodiment, the relationship between the acceleration and the speed is defined, and a speed corresponding to the minimum acceleration a1 is identified as the reference speed. For example, in FIG. 16, the horizontal axis represents an absolute value of the acceleration, and the vertical axis represents the speed. As illustrated in FIG. 16, a straight line "g" is defined that, when the absolute value of the acceleration is 0, the speed is V2, and when the absolute value of the acceleration is equal to or greater than $|a_{min}|$, the speed is V1. Then, the speed corresponding to |a1| is set as the reference speed V0. Here, the straight line is used, however, when there is any appropriate curve, it may be employed. Moreover, as illustrated by a dotted line in FIG. 16, a straight line "h" may be defined that, when the absolute value of the acceleration is equal to or greater than 0 and less than $|a_{min}|$, the speed is V2, and when the absolute value of the acceleration is equal to or greater than $|a_{min}|$, the speed is V1. Then, the speed corresponding to |a1| may be set as the reference speed V0. A curve similar to these straight lines may be defined.

After that, the reference speed setting unit 3200 sets ON for the third flag for enabling the regenerative control based on the reference speed and sets OFF (which represents that the brake is not changed from ON to OFF) for the first flag that represents whether or not the brake was changed from ON to OFF (step S229). Then, the processing shifts to the processing of FIG. 6 through the terminal B.

By performing the aforementioned processing, it becomes possible to determine the reference speed V0 without using the brake sensor 107 and to perform the regenerative control by the regeneration amount based on the reference speed V0.

In the aforementioned explanation, the minimum acceleration a1 is employed as a characteristic acceleration during the braking operation. However, a predetermined range (a range having a very short width) before and after the minimum acceleration a1 is identified as a characteristic portion, and any acceleration within the characteristic portion may be employed instead of the minimum acceleration a1. The characteristic portion may be determined by other methods.

Moreover, in the aforementioned explanation, the temporal change in the acceleration from a timing when it is estimated that the brake was changed to ON to a timing when it is estimated that the brake was changed to OFF is observed to identify the minimum acceleration a1 as the characteristic acceleration. However, any other characteristic acceleration may be identified or an acceleration at another characteristic timing may be identified.

When another characteristic timing exists, the speed at the characteristic timing may be employed as the reference speed.

[Modification 1 of the Embodiment 2]

Figure 17:
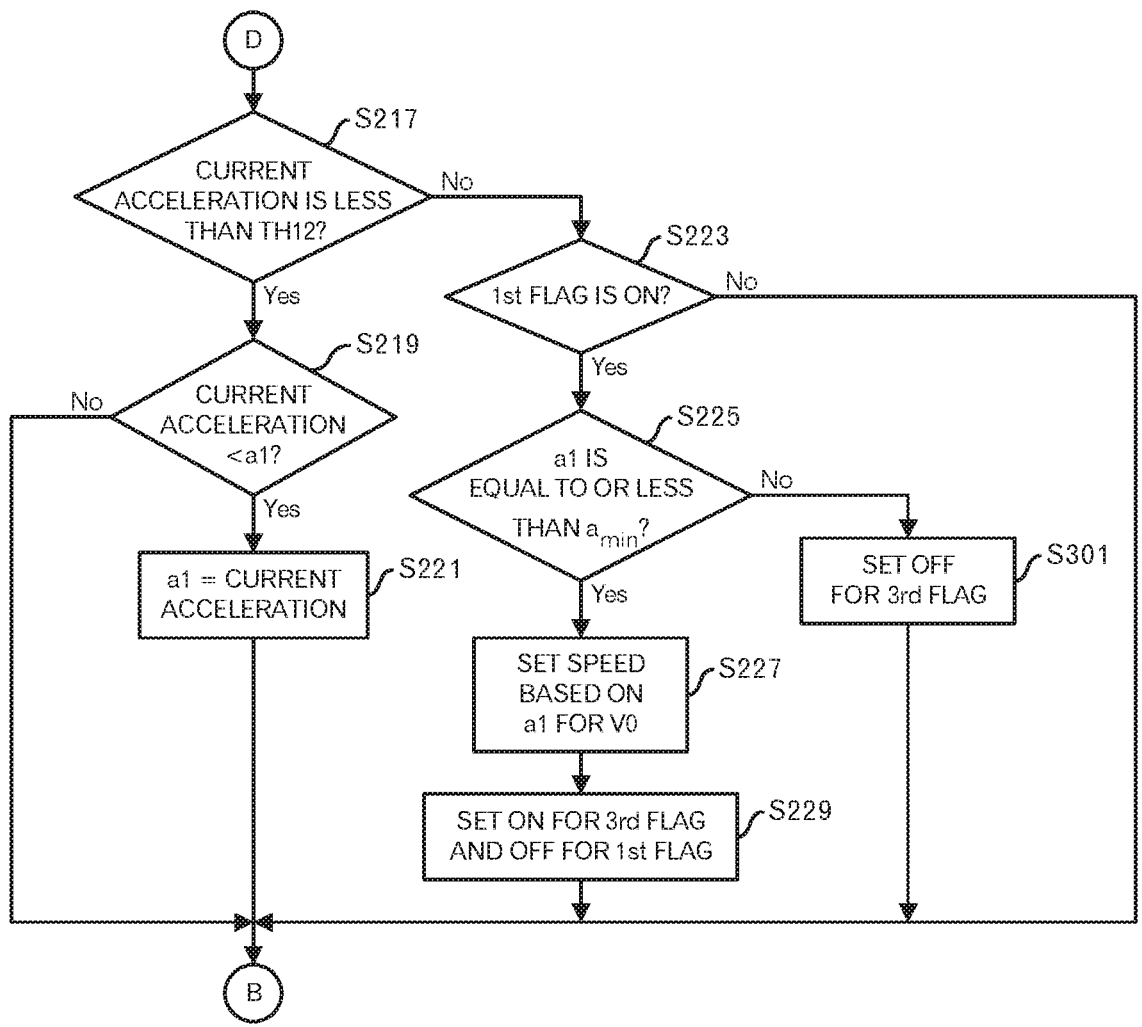
FIG. 17 is a diagram depicting a processing flow in a first modification of the second embodiment.

For example, the processing of FIG. 13 may be changed to a processing illustrated in FIG. 17.

In FIG. 17, the step S231 in FIG. 13 is changed to step S301, and the processing flow is also changed so as to shift to the processing of FIG. 6 through the terminal B after the step S301.

At the step S301, the reference speed setting unit 3200 sets OFF (which represents "not enabled") for the third flag for enabling the regenerative control based on the reference speed.

Figure 18:
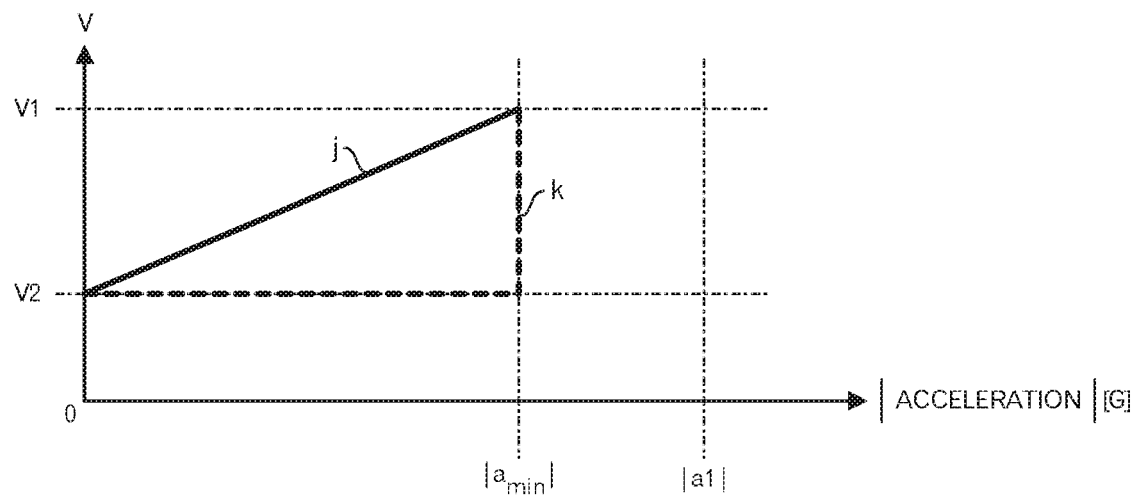
FIG. 18 is a diagram to explain the first modification of the second embodiment.

In FIG. 16, the relationship between the acceleration and the speed is defined, and the speed corresponding to the minimum acceleration a1 is identified as the reference speed. However, in case where no sudden braking is not performed, the absolute value |a1| of the minimum acceleration becomes equal to or less than the absolute value $|a_{min}|$ of the threshold. Therefore, the reference speed can be determined within an estimated range. However, in case where the sudden braking is performed, when the relationship between the acceleration and the speed is defined from V1, V2 and $|a_{min}|$ in FIG. 18 similarly to FIG. 16, the absolute value |a1| of the minimum acceleration exceeds the absolute value $|a_{min}|$ of the threshold. This is an unexpected situation. In addition, this may be a sudden braking against the intention of the user. For example, when, by performing the sudden braking for some reason at a timing of 15 Km/h (=V1) in the middle of acceleration from 0 to 20 Km/h, the speed is reduced to 5 Km/h (=V2), the regenerative control relating to this embodiment is unnecessary because the user's target speed is 20 Km/h. Therefore, the processing in this modification may be employed. In FIG. 18, a portion that exceeds the absolute value $|a_{min}|$ of the threshold represents an undefined state, and the relationship between the acceleration and the speed is defined according to an object of this modification. The straight line "j" is a portion of the straight line "g" in FIG. 16, and the straight line "k" represented by a dotted line is a portion of the straight line "h" in FIG. 16.

[Modification 2 of the Embodiment 2]

In the second embodiment, FIG. 6 is also used. However, FIG. 10 may be used instead of FIG. 6.

By doing so, it is possible to introduce the modification example of the first embodiment into the second embodiment.

[Modification 3 of the Embodiment 2]

In the second embodiment, the brake sensor 107 is not used. However, when the brake sensor 107 is equipped for other purposes, the second embodiment may be modified so as to use the output from the brake sensor 107.

In other words, in the aforementioned example, the temporal change in the acceleration from a timing when ON of the brake is estimated to a timing when OFF of the brake is estimated is observed. However, in this modification, instead of the estimated timings, the temporal change in the acceleration from a timing when ON of the brake is detected to a timing when OFF of the brake is detected is observed.

More specifically, at the step S201 in FIG. 12, it is determined whether or not the current acceleration is equal to or less than the threshold TH11. However, in this case, it is determined whether or not the brake sensor 107 outputs ON. In addition, at the step S209, it is determined whether or not the current acceleration is equal to or greater than the threshold TH12. However, in this case, it is determined whether or not the brake sensor 107 outputs OFF.

In another viewpoint, in the second embodiment, as described for FIGS. 14 and 15, ON/OFF of the brake flag is set based on the temporal change in the acceleration, and the temporal change in the acceleration from a timing when the brake flag was changed to ON to a timing when the brake flag was changed to OFF is observed.

Figure 19:
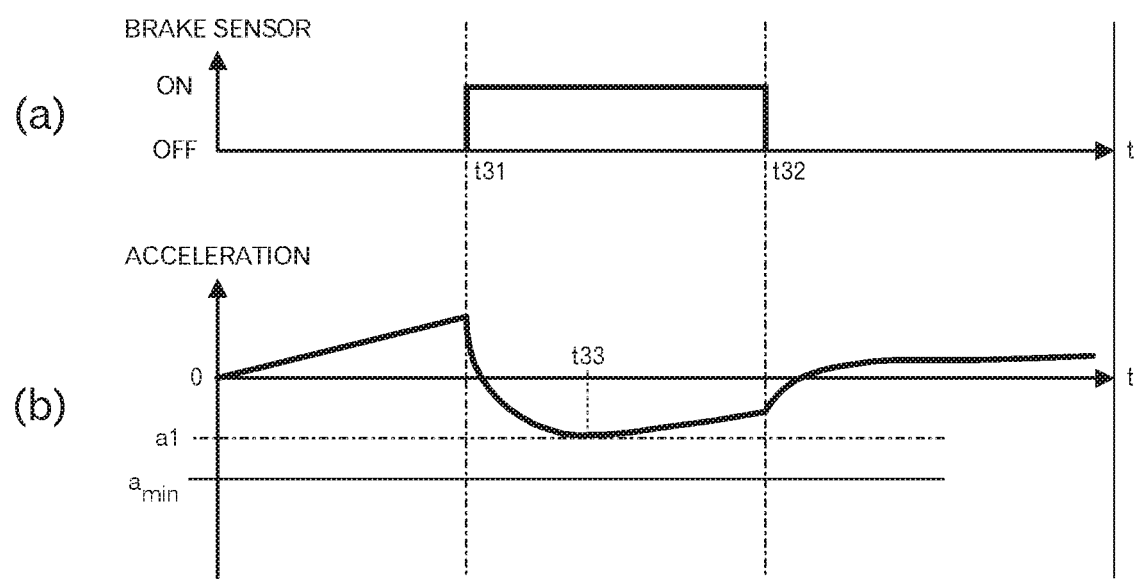
FIG. 19 is a diagram to explain temporal changes in the acceleration and the output of the brake sensor in case of the normal braking operation.
Figure 20:
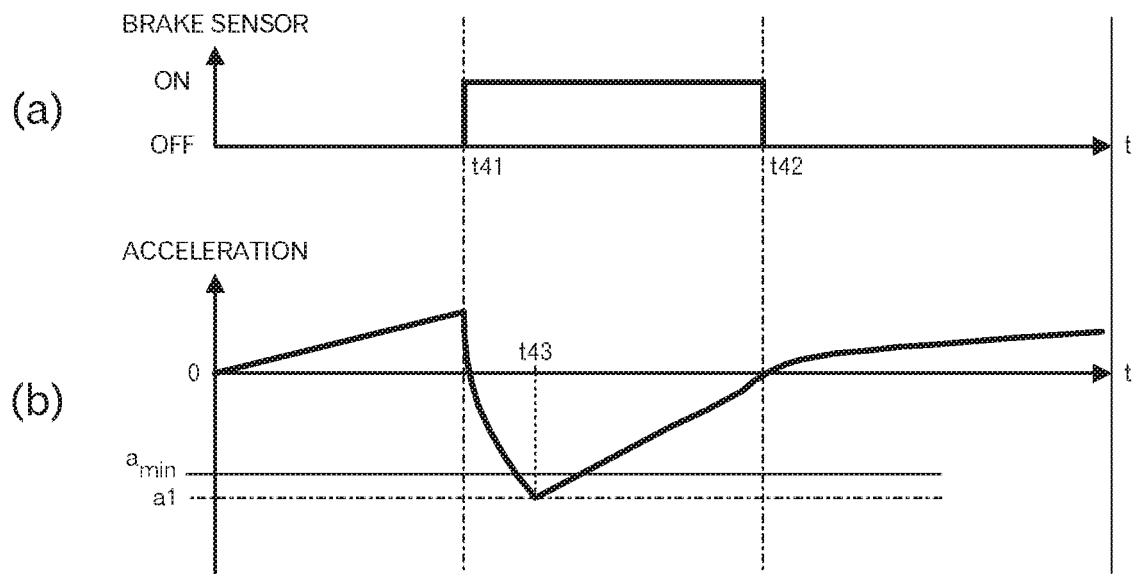
FIG. 20 is a diagram to explain temporal changes in the acceleration and the output of the brake sensor in case of the sudden braking.

On the other hand, in this modification, as illustrated in FIGS. 19 and 20, the period during which the temporal change in the acceleration is to be observed is fixed according to ON/OFF of the brake sensor 107. FIG. 19 illustrates examples of the temporal changes of the brake sensor 107 and the acceleration in case where the normal braking operation is performed. (a) in FIG. 19 represents the temporal change of ON/OFF of the brake sensor 107, and the temporal change of ON/OFF of the brake flag is the same in this modification. In addition, (b) represents the temporal change in the acceleration. The temporal change in the acceleration itself is the same as (a) in FIG. 14, and time t33 is the same as the time t13 in (a) in FIG. 14. However, a period to be observed is a period from time t31 to time t32, and this period is different from the period from the time t11 to the time t12. However, the characteristic acceleration $a_1$ is included.

In addition, FIG. 20 illustrates examples of the temporal changes of the brake sensor and the acceleration in case where the sudden braking is performed. (a) in FIG. 20 represents the temporal change of ON/OFF of the brake sensor 107, and the temporal change of ON/OFF of the brake flag is the same. Moreover, (b) represents the temporal change in the acceleration. The temporal change in the acceleration itself is the same as (a) in FIG. 15, and time t43 is the same as the time t23 in (a) of FIG. 15. However, the period to be observed is a period from time t41 to time t42, and this period is different from the period from the time t21 to the time t22. However, the characteristic acceleration $a_1$ is included.

With this modification, it is possible to securely grasp the time band during ON of the brake, and there is no need to adjust and set the thresholds TH11 and TH12.

[Other Modifications]

In the aforementioned embodiments, the regenerative control in which the regeneration coefficient is determined based on the reference speed is performed until OFF is set for the third flag. However, even if OFF is not set for the third flag, the influence of one braking operation may be faded out.

For example, the regeneration coefficient is gradually decreased according to the elapse of the time from a timing when OFF of the brake is detected or a timing when OFF of the brake is estimated.

More specifically, an adjustment coefficient α that gradually decreases according to the elapse of the time as described above is multiplied to the regeneration coefficient. The adjustment coefficient α is a value equal to or greater than 0 and equal to or less than 1.

Figure 21:
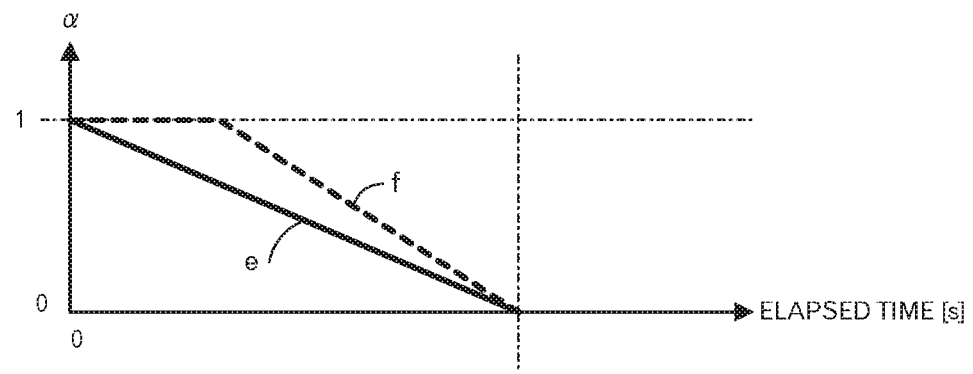
FIG. 21 is a diagram to explain an adjustment coefficient to be multiplied to the regeneration coefficient.

An example of the temporal change in the adjustment coefficient α is illustrated in FIG. 21. In FIG. 21, the vertical axis represents the adjustment coefficient α, and the horizontal axis represents the elapse of the time [s] since the timing when the OFF of the brake is detected or the timing when OFF of the brake is estimated. In FIG. 21, a straight line "e" represents an example that the adjustment coefficient a linearly decreases soon since the timing when OFF of the brake is detected or the timing when OFF of the brake is estimated.

On the other hand, straight lines "f" in FIG. 21 represent an example that the adjustment coefficient α of "1" is kept during a certain period from the timing when OFF of the brake is detected or the timing when OFF of the brake is estimated, and after the certain period, the adjustment coefficient linearly decreases. In the aforementioned embodiments, the regeneration coefficient gradually increases. Therefore, the adjustment coefficient α is kept to be "1" while the regeneration coefficient increases to some extent, and after that, the adjustment coefficient α gradually decreases. The adjustment coefficient α may be decreased along other curves instead of linearly.

On a long downhill road, there is a case where the user does not want to rapidly accelerate after OFF of the brake, however, the user wants to gradually accelerate after a certain time period elapsed. This modification can cope with such a case. If the user feels that the speed is too fast after that, the user performs the braking operation. Therefore, it is possible to perform the aforementioned regenerative control again.

Although the embodiments of this invention were explained above, this invention is not limited to those. For example, according to the purpose, any arbitrary technical feature in the respective aforementioned embodiments may be deleted, and any arbitrary technical feature described in the other embodiments may be added. Moreover, in the aforementioned examples, one cycle from ON of the brake to OFF of the brake is merely explained. However, in the next cycle, the reference speed V0 is updated and the same processing is performed. For example, there is a case where the braking operation is performed twice or more when running down a long downhill. However, the reference speed V0 is updated for each time. Then, an appropriate control is performed for each event.

Furthermore, the aforementioned functional block diagrams are mere examples, and one functional block may be divided into plural functional blocks, and plural functional blocks may be integrated into one functional block. As for the processing flows, as long as the processing contents do not change, the order of the steps may be changed, and plural steps may be executed in parallel.

The computing unit 1021 may be implemented partially or entirely by dedicated circuits, or by executing programs prepared in advance, the aforementioned functions may be realized.

The kinds of aforementioned sensors are mere examples, and other sensors that can measure the aforementioned parameters may be employed.

The aforementioned embodiments are summarized as follows:

A motor driving control apparatus relating to a first mode in the embodiments includes: (A) an inverter (e.g. a driving unit) configured to drive a motor; and (B) a controller configured to determine a regeneration amount based on a first speed of a vehicle at a first timing when it is detected that a brake of the vehicle that moves by the motor driven by the inverter was changed to OFF, and control the inverter according to the regeneration amount.

The inventors unobviously recognized that, as the user's intention, which appears in the braking operation, the first speed at the first timing when it is detected that the brake was changed to OFF is preferable. Therefore, the regenerative control is performed based on the first speed.

Moreover, the aforementioned controller may be configured to determine a regeneration amount based on a second speed of the vehicle at a second timing when it is detected that the brake was changed to ON, in case where an acceleration of the vehicle during ON of the brake is less than a threshold. For example, when the sudden braking was performed, it is considered that the second speed at the second timing is more preferable than the first speed at the first timing.

Furthermore, the aforementioned controller may be configured to determine the regeneration amount further based on an acceleration of the vehicle at a processing timing. For example, the aforementioned controller may be configured to determine the regeneration amount according to an acceleration of the vehicle at a processing timing in case where the speed of vehicle at the processing timing exceeds the first speed. By determining the regeneration amount according to the acceleration, the control is performed so as to obtain a preferable speed.

Moreover, the aforementioned controller is configured to determine the regeneration amount according to a difference between a speed of the vehicle at a processing timing and the first speed in case where the speed of vehicle at the processing timing exceeds the first speed. The speed is controlled so as to converge into the first speed as much as possible.

Furthermore, the aforementioned controller may be configured to determine the regeneration amount according to an acceleration of the vehicle at a processing timing in case where the acceleration of the vehicle during ON of the brake is less than the threshold and a speed of the vehicle at the processing timing exceeds the second speed. Also in case of using the second speed as the reference, it may be preferable to determine the regeneration amount according to the acceleration.

A motor driving control apparatus relating to a second mode in the embodiment includes: (C) an inverter (e.g. a driving unit) configured to drive a motor; and (D) a controller configured to determine a first speed of a vehicle, which is a reference speed, based on temporal change in an acceleration of the vehicle that moves by the motor driven by the inverter, and control the inverter according to a regeneration amount that is based on the first speed.

Because the user's intention is presumed by the temporal change in the acceleration, when the first speed that is the reference speed is determined based on the temporal change in the acceleration and the regenerative control is performed based on the first speed, the travelling can be performed according to the user's intention. The aforementioned control may be performed when a speed of the vehicle at a processing timing exceeds the first speed.

Moreover, the aforementioned temporal change in the acceleration of the vehicle may be temporal change in an acceleration of the vehicle from a first timing when it is estimated that a brake of the vehicle was changed to ON to a second timing when it is estimated that the brake of the vehicle was changed to OFF. This is in order to presume the user's intention which appears in the braking operation.

Furthermore, the aforementioned controller may be configured to determine, as the first speed, a speed corresponding to an acceleration detected in a characteristic portion included in a time range from a first timing when it is estimated or detected that a brake of the vehicle was changed to ON to a second timing when it is estimated or detected that the brake of the vehicle was changed to OFF. The characteristic portion includes the minimum acceleration, for example, however, the characteristic portion may include an acceleration similar to the minimum acceleration instead of the minimum acceleration itself.

Moreover, the aforementioned controller may be configured to determine the regeneration amount based on a difference between a speed of the vehicle at a processing timing and the first speed in case where the speed of the vehicle at the processing timing exceeds the first speed. The speed is controlled so as to converge to the first speed as much as possible.

In addition, the aforementioned controller may be configured to determine the regeneration amount based on an acceleration of the vehicle at a processing timing in case where the speed of the vehicle at the processing timing exceeds the first speed. By determining the regeneration amount according to the acceleration, the control is performed so as to obtain the preferable speed.

Furthermore, the aforementioned controller may be configured to suspend the control of the inverter according to the regeneration amount that is based on the first speed in case where the acceleration detected in the characteristic portion is less than a threshold. This is because there is a case where the travelling state has to be suddenly changed due to an unintentional reason.

Moreover, the aforementioned controller may be configured to determine the regeneration amount based on a third speed of the vehicle at the first timing in case where the acceleration detected in the characteristic portion is less than a threshold. In case of the sudden braking, this action may be preferable.

The aforementioned controller may be configured to correct the regeneration amount so as to gradually decrease according to elapsed time. There is a case where it is preferable to change the traveling state so that the regenerative braking is faded out.

Moreover, the aforementioned controller may be configured to suspend the control of the inverter according to the regeneration amount when any one of first to third conditions is satisfied, wherein the first condition is that a pedal rotation angle is equal to or greater than a first threshold, the second condition is that a pedal torque input is equal to or greater than a second threshold, and the third condition is that a speed of the vehicle at a processing timing is equal to or less than a predetermined speed. This is because it may not be preferable to perform the aforementioned regenerative braking, when the user rotates the pedals to some extent, when the user pedals with some force, or when the speed is too slow.

The aforementioned configurations are not limited to matters described in the embodiments and other configurations that provide substantially the same effects may be employed.

What is claimed is:

1. A motor driving control apparatus, comprising:
   an inverter configured to drive a motor; and
   a controller configured to determine a regeneration amount based on a first speed of a vehicle at a first timing when it is detected that a brake of the vehicle that moves by the motor driven by the inverter was changed to OFF, and control the inverter according to the regeneration amount;
   wherein the controller is configured to suspend the control of the inverter according to the regeneration amount when any one of first to third conditions is satisfied, wherein the first condition is that a pedal rotation angle is equal to or greater than a first threshold, the second condition is that a pedal torque input is equal to or greater than a second threshold, and the third condition is that a speed of the vehicle at a processing timing is equal to or less than a predetermined speed.

2. The motor driving control apparatus as set forth in claim 1, wherein the controller is configured to determine a regeneration amount based on a second speed of the vehicle at a second timing when it is detected that the brake was changed to ON, in case where an acceleration of the vehicle during ON of the brake is less than a threshold.

3. The motor driving control apparatus as set forth in claim 2, wherein the controller is configured to determine the regeneration amount according to an acceleration of the vehicle at a processing timing in case where the acceleration of the vehicle during ON of the brake is less than the threshold and a speed of the vehicle at the processing timing exceeds the second speed.

4. The motor driving control apparatus as set forth in claim 1, wherein the controller is configured to determine the regeneration amount further based on an acceleration of the vehicle at a processing timing.

5. The motor driving control apparatus as set forth in claim 1, wherein the controller is configured to determine the regeneration amount according to a difference between a speed of the vehicle at a processing timing and the first speed in case where the speed of vehicle at the processing timing exceeds the first speed.

6. The motor driving control apparatus as set forth in claim 1, wherein the controller is configured to determine the regeneration amount according to an acceleration of the vehicle at a processing timing in case where the speed of vehicle at the processing timing exceeds the first speed.

7. The motor driving control apparatus as set forth in claim 1, wherein the controller is configured to correct the regeneration amount so as to gradually decrease according to elapsed time.

8. A motor driving control apparatus, comprising:
   an inverter configured to drive a motor; and
   a controller configured to determine a first speed of a vehicle, which is a reference speed, based on temporal change in an acceleration of the vehicle that moves by the motor driven by the inverter, and control the inverter according to a regeneration amount that is based on the first speed;
   wherein the controller is configured to suspend the control of the inverter according to the regeneration amount when any one of first to third conditions is satisfied, wherein the first condition is that a pedal rotation angle is equal to or greater than a first threshold, the second condition is that a pedal torque input is equal to or greater than a second threshold, and the third condition is that a speed of the vehicle at a processing timing is equal to or less than a predetermined speed.

9. The motor driving control apparatus as set forth in claim 8, wherein the temporal change in the acceleration of the vehicle is temporal change in an acceleration of the vehicle from a first timing when it is estimated that a brake of the vehicle was changed to ON to a second timing when it is estimated that the brake of the vehicle was changed to OFF.

10. The motor driving control apparatus as set forth in claim 8, wherein the controller is configured to determine, as the first speed, a speed corresponding to an acceleration detected in a characteristic portion included in a time range from a first timing when it is estimated or detected that a brake of the vehicle was changed to ON to a second timing when it is estimated or detected that the brake of the vehicle was changed to OFF.

11. The motor driving control apparatus as set forth in claim 10, wherein the controller is configured to suspend the control of the inverter according to the regeneration amount that is based on the first speed in case where the acceleration detected in the characteristic portion is less than a threshold.

12. The motor driving control apparatus as set forth in claim 10, wherein the controller is configured to determine the regeneration amount based on a third speed of the vehicle at the first timing in case where the acceleration detected in the characteristic portion is less than a threshold.

13. The motor driving control apparatus as set forth in claim 8, wherein the controller is configured to determine the regeneration amount based on a difference between a speed of the vehicle at a processing timing and the first speed in case where the speed of the vehicle at the processing timing exceeds the first speed.

14. The motor driving control apparatus as set forth in claim 8, wherein the controller is configured to determine the regeneration amount based on an acceleration of the vehicle at a processing timing in case where the speed of the vehicle at the processing timing exceeds the first speed.

15. The motor driving control apparatus as set forth in claim 8, wherein the controller is configured to correct the regeneration amount so as to gradually decrease according to elapsed time.

16. A motor-assisted vehicle, comprising:
   a motor driving control apparatus, comprising:
   an inverter configured to drive a motor; and
   a controller configured to determine a regeneration amount based on a first speed of a vehicle that moves by the motor driven by the inverter, and control the inverter according to the regeneration amount, wherein the first speed is a speed at a first timing when it is detected that a brake of the vehicle was changed to OFF, or is determined based on temporal change in an acceleration of the vehicle;
   wherein the controller is configured to suspend the control of the inverter according to the regeneration amount when any one of first to third conditions is satisfied, wherein the first condition is that a pedal rotation angle is equal to or greater than a first threshold, the second condition is that a pedal torque input is equal to or greater than a second threshold, and the third condition is that a speed of the vehicle at a processing timing is equal to or less than a predetermined speed.

* * * * *